(12) United States Patent
Zhang et al.

(10) Patent No.: US 12,450,505 B2
(45) Date of Patent: Oct. 21, 2025

(54) UTILIZING LARGE LANGUAGE MODEL RESPONSES TO TRAIN AN INFERENCE PATTERN ENGINE

(71) Applicant: Tiny Fish Inc., Cupertino, CA (US)

(72) Inventors: Shuhao Zhang, Cupertino, CA (US); Qi Zhai, Hillsborough, CA (US); Pavlo Dudka, Mountain View, CA (US); Mark Yi Chien Peng, Belmont, CA (US); FNU Taha Junaid, Mountain View, CA (US)

(73) Assignee: Tiny Fish Inc., Cupertino, CA (US)

( * ) Notice: Subject to any disclaimer, the term of this patent is extended or adjusted under 35 U.S.C. 154(b) by 0 days.

(21) Appl. No.: 18/789,437

(22) Filed: Jul. 30, 2024

(65) Prior Publication Data

US 2025/0068942 A1    Feb. 27, 2025

Related U.S. Application Data

(63) Continuation-in-part of application No. 18/415,431, filed on Jan. 17, 2024, now Pat. No. 12,174,906.

(60) Provisional application No. 63/534,541, filed on Aug. 24, 2023.

(51) Int. Cl.
*G06F 16/00* (2019.01)
*G06N 5/04* (2023.01)

(52) U.S. Cl.
CPC .................................... *G06N 5/04* (2013.01)

(58) Field of Classification Search
None
See application file for complete search history.

(56) References Cited

U.S. PATENT DOCUMENTS

| | | | |
|---|---|---|---|
| 7,231,606 B2 | 6/2007 | Miller | |
| 8,255,812 B1 | 8/2012 | Parparita | |
| 9,286,290 B2 * | 3/2016 | Allen | ............... G06F 40/205 |
| 9,641,591 B1 | 5/2017 | Kolam | |
| 9,811,248 B1 | 11/2017 | Berg | |
| 9,824,151 B2 | 11/2017 | Freund | |
| 10,296,571 B2 | 5/2019 | Kosonen | |
| 10,366,140 B2 | 7/2019 | Butt | |
| 10,382,379 B1 | 8/2019 | Zhang | |
| 10,521,106 B2 | 12/2019 | Cao | |
| 10,572,894 B1 | 2/2020 | Traupman | |
| 10,585,927 B1 | 3/2020 | Liao | |
| 10,628,630 B1 | 4/2020 | Surace | |

(Continued)

FOREIGN PATENT DOCUMENTS

| | | |
|---|---|---|
| CN | 103268337 | 8/2013 |
| CN | 106709062 | 5/2017 |

(Continued)

*Primary Examiner* — Jean M Corrielus
(74) *Attorney, Agent, or Firm* — Van Pelt, Yi & James LLP

(57) ABSTRACT

A prompt is generated based on an input and processed webpage or application content. The prompt is provided to a large language model. Based on a response received from the large language model that maps one or more variables associated with the input to one or more elements associated with the processed content associated with the tree data structure received from the large language, a pattern mapping the one or more variables associated with the input to the one or more elements associated with the processed content associated with the tree data structure is derived.

20 Claims, 21 Drawing Sheets

(56) References Cited

U.S. PATENT DOCUMENTS

| | | | |
|---|---|---|---|
| 11,100,295 B2* | 8/2021 | Hirzel | G10L 15/18 |
| 11,748,243 B2 | 9/2023 | Finkelstein | |
| 12,010,076 B1* | 6/2024 | Andrew | H04L 51/02 |
| 12,014,192 B2 | 6/2024 | Riva | |
| 12,067,362 B2* | 8/2024 | Tunstall-Pedoe | G06N 3/0455 |
| 12,073,180 B2* | 8/2024 | Tunstall-Pedoe | G06F 40/279 |
| 12,333,260 B2 | 6/2025 | Shi | |
| 2006/0020481 A1 | 1/2006 | Lee | |
| 2006/0020515 A1 | 1/2006 | Lee | |
| 2007/0234217 A1 | 10/2007 | Miller | |
| 2009/0012969 A1 | 1/2009 | Rail | |
| 2009/0083363 A1 | 3/2009 | Kiciman | |
| 2009/0083409 A1 | 3/2009 | Kiciman | |
| 2009/0083714 A1 | 3/2009 | Kiciman | |
| 2009/0089312 A1 | 4/2009 | Chi | |
| 2009/0100345 A1 | 4/2009 | Miller | |
| 2009/0327235 A1 | 12/2009 | Coladonato | |
| 2011/0015954 A1 | 1/2011 | Ward | |
| 2012/0192155 A1 | 7/2012 | Silbey | |
| 2015/0154158 A1 | 6/2015 | Zeine | |
| 2015/0309990 A1* | 10/2015 | Allen | G06F 40/177 704/9 |
| 2016/0042411 A1 | 2/2016 | Avner | |
| 2016/0196111 A1 | 7/2016 | Pujari | |
| 2017/0061528 A1 | 3/2017 | Arora | |
| 2017/0091158 A1 | 3/2017 | Zeine | |
| 2017/0169118 A1 | 6/2017 | Jhaj | |
| 2017/0257393 A1 | 9/2017 | De Barros | |
| 2017/0277625 A1 | 9/2017 | Shtuchkin | |
| 2018/0060303 A1* | 3/2018 | Sarikaya | G10L 15/22 |
| 2018/0101537 A1 | 4/2018 | Govindarajan | |
| 2018/0184178 A1 | 6/2018 | Hoeben | |
| 2019/0050461 A1 | 2/2019 | Schrader | |
| 2019/0179940 A1 | 6/2019 | Ross | |
| 2019/0260750 A1 | 8/2019 | Mehrdad | |
| 2019/0279084 A1 | 9/2019 | Darachi, Jr. | |
| 2019/0340224 A1 | 11/2019 | Akhoury | |
| 2019/0340256 A1 | 11/2019 | Kulkarni | |
| 2020/0004798 A1 | 1/2020 | Weinert, Jr. | |
| 2020/0065377 A1* | 2/2020 | Hirzel | G10L 15/22 |
| 2020/0089597 A1 | 3/2020 | Kastyshyn | |
| 2020/0097303 A1 | 3/2020 | O'Kane | |
| 2020/0184960 A1* | 6/2020 | Suzuki | G10L 15/16 |
| 2020/0249963 A1 | 8/2020 | Yeh | |
| 2020/0334301 A1 | 10/2020 | Walters | |
| 2020/0349215 A1 | 11/2020 | McMurray | |
| 2021/0019309 A1 | 1/2021 | Yadav | |
| 2021/0191986 A1* | 6/2021 | Okajima | G06F 40/221 |
| 2021/0256076 A1 | 8/2021 | McMurray | |
| 2021/0295382 A1 | 9/2021 | Buchanan | |
| 2021/0304064 A1 | 9/2021 | Mudi | |
| 2021/0311939 A1 | 10/2021 | Shtilkind | |
| 2021/0392144 A1 | 12/2021 | Vaidyanath | |
| 2022/0269736 A1 | 8/2022 | Walters | |
| 2022/0284064 A1 | 9/2022 | Shaw | |
| 2023/0095006 A1 | 3/2023 | Riva | |
| 2023/0161972 A1* | 5/2023 | Härmä | G06F 40/56 704/9 |
| 2023/0195825 A1 | 6/2023 | Rajagopal | |
| 2023/0274094 A1* | 8/2023 | Tunstall-Pedoe | G06F 40/30 704/9 |
| 2023/0393810 A1 | 12/2023 | Lange | |
| 2024/0242154 A1* | 7/2024 | Jindal | G06Q 10/0637 |
| 2024/0281446 A1* | 8/2024 | Bathwal | G06F 16/9538 |
| 2024/0289360 A1* | 8/2024 | Chepkwony | G06F 16/3328 |
| 2024/0303441 A1* | 9/2024 | Sobhy Deraz | G06T 11/206 |

FOREIGN PATENT DOCUMENTS

| | | |
|---|---|---|
| CN | 108009183 | 5/2018 |
| CN | 108769832 | 11/2018 |
| CN | 111367414 | 10/2020 |
| CN | 112540736 | 3/2021 |
| CN | 114127672 | 3/2022 |
| CN | 114647806 | 6/2022 |
| CN | 114780893 | 7/2022 |
| CN | 115017397 | 9/2022 |
| CN | 117555539 | 2/2024 |
| EP | 3767567 | 1/2021 |

* cited by examiner

```
header {
    login_btn
    search_box
    search_btn
}
```

FIG. 1A

```
header {
    login_btn
}
```

FIG. 1B

```
<hierarchy rotation="0">
<node index="0" text="Login" class="android.widget.navigation"
 content-desc="" checkable="false" checked="false"
 clickable="false" enabled="true" focusable="false" focused="false" scrollable="false"
 long-clickable="false" password="false" selected="false" bounds="[0,1368][980,1877]">
 <node index="0" text="" class="android.widget.button" content-desc="Login"
  clickable="true" enabled="true" focusable="false" focused="false" scrollable="false"
  long-clickable="false" password="false" selected="false" bounds="[106,1015][137,1050]"/>
 <node index="0" text="Tap to Search" class="android.widget.TextInput"
  content-desc="Tap to search" checkable="false" checked="false"
  clickable="false" enabled="true" focusable="false" focused="false" scrollable="false"
  long-clickable="false" password="false" selected="false" bounds="[106,1415][137,1457]"/>
 <node index="0" text="Search" class="android.widget.Button" content-desc="Search button"
  checkable="false" checked="false" clickable="false" enabled="true" focusable="false"
  focused="false" scrollable="true" long-clickable="false" password="false" selected="false"
  bounds="[148,1418][269,1455]"/>
</node>
</hierarchy>
```

FIG. 1C

```
{
    "tf_11": {
        "role": "navigation"
        "html_tag": "header"
        "children": {
           "tf_22": {
              "role": "button",
              "name": "login",
              "html_tag": "button"
           },
           "APjFqb": {
              "role": "combobox",
              "name": "Search",
              "html_tag": "textarea"
           },
           "tf_194": {
              "role": "button",
              "name": "Search",
              "html_tag": "button"
           }
        }
    },
    //All other HTML elements
}
```

FIG. 2A

```
{
    "role": "navigation",
    "attributes": {
        "bounds": "[0,1368] [980,1877]"
    },
    "children": [
        {
            "attributes": {
                "bounds": "[106,1015] [137,1050]",
                "id": ""
            },
            "html_tag": "button",
            "tf623_id": "32",
            "name": "Login",
            "role": "button"
        },
        {
            "attributes": {
                "bounds": "[106,1415] [137,1457]",
                "id": ""
            },
            "html_tag": "input",
            "tf623_id": "34",
            "name": "Tap to search",
            "role": "text_input"
        },
        {
            "attributes": {
                "bounds": "[148,1418] [269,1455]"
            },
            "children": [],
            "html_tag": "button",
            "tf623_id": "35",
            "name": "Search",
            "role": "button"
        }
    ]
}
```

FIG. 2B

```
{
  header {
    "login_btn": {
      "role": "button",
      "name": "login",
      "id": "tf_22",
      "html_tag": "button"
    },
    "search_box": {
      "role": "combobox",
      "name": "Search",
      "id": "APjFqb",
      "html_tag": "textarea"
    },
    "search_btn": {
      "role": "button",
      "name": "Search",
      "id": "tf_194",
      "html_tag": "button"
    }
  }
}
```

FIG. 3A

```
{
  "navigation": [
    {
      "login_button": {
        "role": "button",
        "tf623_id": "32",
        "html_tag": "button",
        "name": "Login",
        "attributes": {
            "bounds": "[106,1015] [137,1050]",
            "id": ""
        }
      },
      "search_input": {
        "role": "input",
        "tf623_id": "34",
        "html_tag": "text_input",
        "name": "Tap to search",
        "attributes": {
            "bounds": "[106,1415] [137,1457]",
            "id": ""
        }
      },
      "search_button": {
        "role": "button",
        "tf623_id": "35",
        "html_tag": "button",
        "name": "Search",
        "attributes": {
            "bounds": "[148,1418] [269,1455]",
            "id": ""
        }
      }
    }
  ]
}
```

FIG. 3B

UTILIZING LARGE LANGUAGE MODEL RESPONSES TO TRAIN AN INFERENCE PATTERN ENGINE

CROSS REFERENCE TO OTHER APPLICATIONS

This application is a continuation in part of U.S. patent application Ser. No. 18/415,431 entitled UTILIZING A QUERY RESPONSE TO AUTOMATE A TASK ASSOCIATED WITH A WEBPAGE filed Jan. 17, 2024, which claims priority to U.S. Provisional Patent Application No. 63/534,541 entitled WEB AGENT DESCRIPTION LANGUAGE filed Aug. 24, 2023, each of which is incorporated herein by reference for all purposes.

BACKGROUND OF THE INVENTION

A large language model (LLM) may be utilized to perform a functional task, that is, the same input is provided to the LLM and the LLM is expected to provide the same output. However, the results outputted by the LLM are known to be affected by some known behaviors associated with LLMs. LLMs can hallucinate. As a result, it can be difficult to guarantee any two runs of the same input yields exactly the same output since new responses may be generated on each prompt.

Furthermore, LLMs are expensive computationally, which impacts both cost and speed. LLMs do not scale well with larger input sizes. The context window of an LLM is determined by the number of tokens. As the input size increases, the time required for the LLM to generate a response also increases.

BRIEF DESCRIPTION OF THE DRAWINGS

Various embodiments of the invention are disclosed in the following detailed description and the accompanying drawings.

FIG. 1A is an example of a query for a website in accordance with some embodiments.

FIG. 1B is an example of a query for a website in accordance with some embodiments.

FIG. 1C is an example of a user interface tree in accordance with some embodiments.

FIG. 2A is an example of processed webpage content in accordance with some embodiments.

FIG. 2B is an example of processed application content in accordance with some embodiments.

FIG. 3A is an example of an LLM response for a webpage in accordance with some embodiments.

FIG. 3B is an example of an LLM response for an application in accordance with some embodiments.

DETAILED DESCRIPTION

Figure 4A:
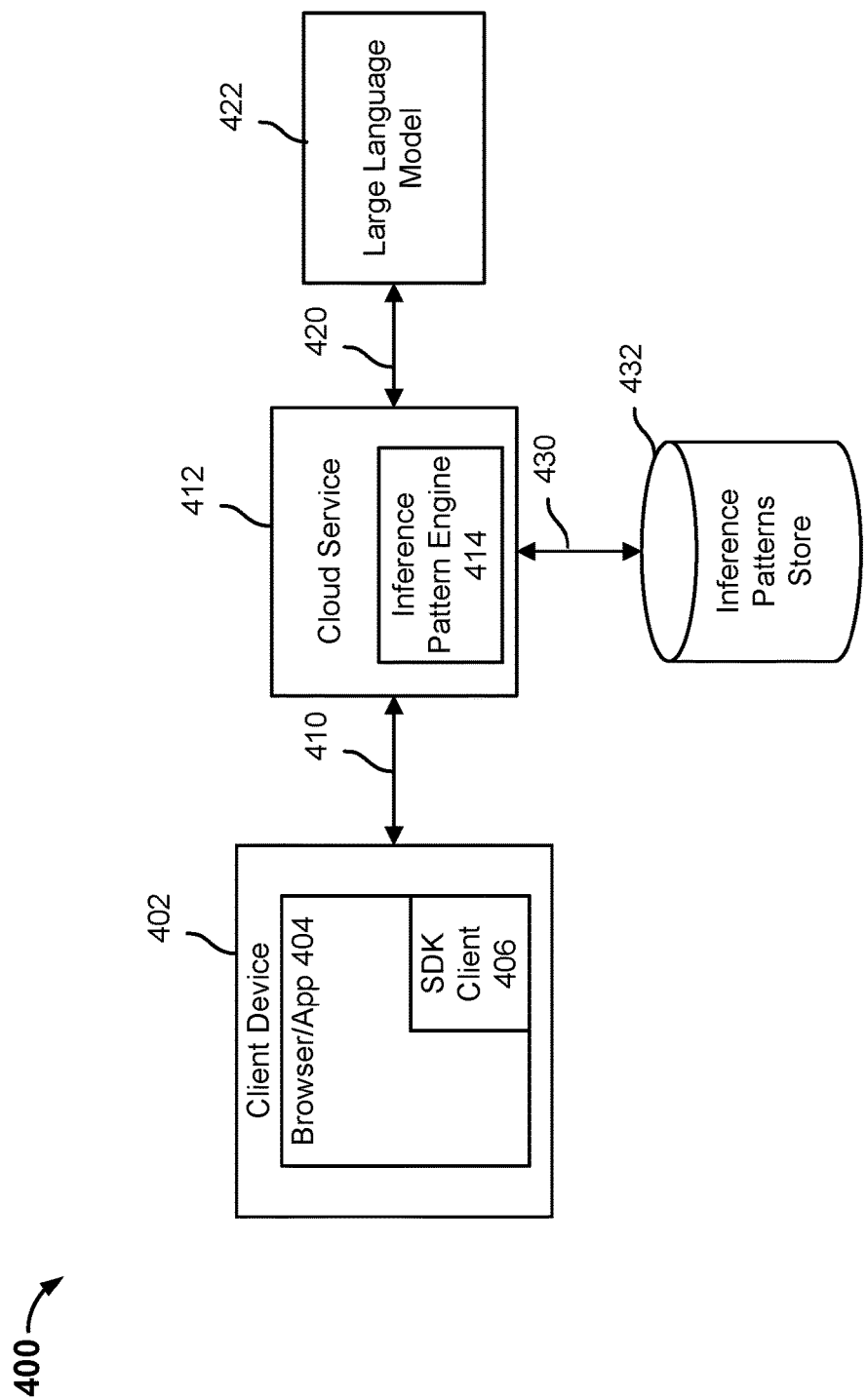
FIG. 4A is a block diagram illustrating a system to generate an adaptable script to automate a task associated with a webpage in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An inference pattern engine is disclosed. The inference pattern engine may be used in place of an LLM to generate an output for a given input. As a result, the generated output is unlikely to include hallucinations since the LLM is not relied upon to generate the response. Furthermore, the response time for a client device to receive a response is reduced (e.g., from seconds to milliseconds) because the LLM does not need to be prompted.

An input is received from a client device or a runtime agent. In some embodiments, the input is a query. The query is a structured request, formulated in natural language, for specific elements from the webpage or application. The query serves as a representation to extract precise information from the webpage or application. The query is structured in a manner that signifies a relationship between a component and the webpage or application. The query is comprised of one or more variables that correspond to one or more specific elements associated with the webpage or application. The query is designed to be versatile across different types of websites and applications (e.g., e-commerce, business, nonprofit, entertainment, event, brochure, membership, forum, social media, etc.). The query can be conveniently applied to different websites or applications, ensuring consistency and efficiency.

FIG. 1A is an example of a query in accordance with some embodiments. The example query may be utilized for a script that automates a booking process for a flight, a hotel, a car, a vacation, a reservation, etc. In the example shown, the query has specified a first variable "login_btn," a second variable "search_box," and a third variable "search_btn." The one or more variables included in a query may correspond to one or more interactive elements associated with a webpage or application. The first variable "login_btn" corresponds to a login button associated with the webpage or application, the second variable "search_box" corresponds to a search box associated with the webpage or application, and the third variable "search_btn" corresponds to a search button associated with the webpage or application.

FIG. 1B is an example of a query in accordance with some embodiments. The example query may be utilized for a script associated with a webpage or an application having a login button within the navigation header. In the example shown, the query has specified a first variable "login_btn." The first variable "login_btn" corresponds to a login button associated with the webpage or application. In both examples of FIG. 1A and FIG. 1B, the variables are given names that correspond to elements associated with a webpage or application that the developer would like to utilize for a script associated with the webpage or application, but are unknown to the developer.

In some embodiments, the input is freeform input. Examples of freeform inputs include, but are not limited to: "book the cheapest flights from SFO to LAX," "book the cheapest flights from PDX to JFK," "book the least expensive flights to DFW from SEA," "book a hotel in San Francisco for Mar 7-12," and "book a stay in Dallas from April first to the $5^{th}$" A natural language processor may be utilized to convert the freeform input into one or more variables. For example, the one or more variables may include "action," "source," "destination," "cost," and "class."

The input is associated with a webpage or application content. The webpage or application content is processed. For webpages, the webpage content is processed as a human-friendly representation of the HMTL associated with the webpage, with notations for each element. For applications, the user interface content is extracted and processed into a consumable format (e.g., JSON, XML, screen shot, etc.). Processing the content (webpage content or application content) includes determining information associated with the elements. For webpage elements, the information associated with the elements include a corresponding "role," a corresponding "name," and a corresponding "html_tag." For applications elements, the information associated with the elements include a corresponding "bounds," a corresponding "role," a corresponding "name," and a corresponding "html_tag."

FIG. 2A is a simplified example of processed webpage content in accordance with some embodiments. In the example shown, for a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element. Although the processed webpage content in the example includes information associated with three webpage elements, the processed webpage content may include information associated with n webpage elements.

FIG. 1C is an example of a user interface tree in accordance with some embodiments. For applications, a user interface tree, such as the user interface tree shown in FIG. 1C, is extracted from the user interface. The user interface tree is processed into a consumable format, such as the simplified example shown in FIG. 2B. The consumable format indicates, for an application element, a "role," a "name," and an "html_tag." The consumable format also includes, for an application element, a "bounds" value, which indicates the location or position of the application element on the user interface of the application.

For an initial iteration, the inference pattern engine generates a prompt based on the input and the processed webpage or application content and provides the prompt, the input, and the processed webpage or application content to an LLM. The LLM generates a response based on the prompt, the input, and the processed webpage or application content. The LLM response maps one or more variables included in the input to one or more corresponding elements associated with the webpage or application content.

FIG. 3A is an example of an LLM response for a webpage in accordance with some embodiments. The LLM response is a structured representation of specified web element nodes. The LLM response maps a variable included in the input to a corresponding webpage element included in the processed webpage content. Users may utilize this mapping to interact with the web element nodes by performing actions, such as click, input, etc. The interaction capability is similar to what a user could perform on the actual web page. In the example shown, for a particular web element, the LLM response indicates a "role," a "name," an "id," and an "html_tag." The "id" parameter determines a specified identifier for a particular web element. The LLM, indicated by the LLM response, has determined which web element corresponds to the variable "login_btn," which web element corresponds to the variable "search_box," and which web element corresponds to the variable "search_btn." Instead of using the specified identifier for a particular web element, a developer may utilize a variable included in the input that corresponds to the particular web element to generate the script to automate a task associated with the webpage.

FIG. 3B is an example of an LLM response for an application in accordance with some embodiments. Similar to the LLM response example in FIG. 3A, the LLM response example in FIG. 3B indicates, for a particular application element, a "role," a "name," an "id," and an "html_tag." In addition, the LLM response, for a particular application element, associates the particular application element with a corresponding "bounds" value." Instead of using the specified identifier for a particular application element, a developer may utilize a variable included in the input that corresponds to the particular application element to generate the script to automate a task associated with the application.

For a freeform input of "book the cheapest flights from SFO to LAX," "book the cheapest flights from PDX to JFK" or "book the least expensive flights to DFW from SEA," the LLM response may include "action: book flights," "source: <Extracted: SFO, PDX, SEA, etc.>" "destination: <Extracted: LAX, JFK, DFW, etc.>" "cost: lowest_cost", or "class (economy vs business): none." For a freeform input of "book a hotel in San Francisco for March 7-12," or "book a stay in Dallas from April first to the 5th," the LLM response may be "action: book hotel", "location <extracted>" "check-in date: <extracted>" and <check-out date: <extracted>".

The inference pattern engine receives the LLM response from the LLM and provides the LLM response to a client device or runtime agent.

The inference pattern engine derives a pattern from the LLM response to map the one or more variables included in the input to one or more corresponding elements associated with the webpage or application content. In some embodiments, the inference pattern engine determines a plurality of beacon nodes associated with a tree data structure. In some embodiments, the tree data structure is associated with a webpage (e.g., document object model (DOM) tree). In some embodiments, the tree data structure is associated with a user interface tree (e.g., the user interface tree of FIG. 1C). The tree data structure associated with a webpage or a user interface tree may be a dynamic tree data structure. That is, each time the webpage or user interface is accessed, the corresponding tree data structure is different, regardless of the tree data structure version. However, a beacon node in a tree data structure is unique because it has a set of attributes (i.e., a fingerprint) that only maps to one element in the tree data structure. Examples of beacon nodes include a node that corresponds to a search box, a node that corresponds to a filter element on a left side of a webpage or application, a node that corresponds to a sponsored product element on a webpage or application.

The paths associated with the plurality of beacon nodes (e.g., three beacon nodes) are utilized to map the one or more variables included in the input to one or more corresponding elements associated with the webpage or application content. A variable included in the input has a corresponding path in the tree data structure. The corresponding paths from the plurality of beacon nodes to the variable included in the input are determined (e.g., triangulation) and stored. For example, a variable included in the input may correspond to a login button. The corresponding paths from a plurality of beacons nodes to a node in the tree data structure corresponding to the login button (as indicated by the mapping generated by the LLM) is stored.

For webpages or applications that may shift structurally, but maintain structurally similarity of sub-trees, the determined path information associated with a plurality of beacons from the initial iteration or a previous iteration may be utilized to predict the location of one or more target nodes. A target node is a node in the tree data structure that corresponds to a variable included in the input corresponding to an element associated with the webpage or application content. For one or more subsequent iterations (e.g., receiving one or more subsequent inputs), the inference pattern engine utilizes a stored derived pattern to generate an inference pattern engine response. Based on a stored derived pattern, the inference pattern engine response maps the one or more variables included in the input to one or more corresponding elements associated with the webpage or application content. The inference pattern engine identifies the plurality of beacon nodes in the new version of the tree data structure. The inference pattern engine utilizes the corresponding stored paths from the plurality of beacon nodes to the one or more target nodes in the previous version of the tree data structure to predict the current paths from the plurality of beacon nodes in the new version of the tree data structure to the one or more target nodes in the new version of the tree data structure.

The inference pattern engine provides metadata to a cloud service. Examples of metadata include a post-processed HTML element tree, the query, the type of data that is to be extracted from the LLM, and/or configuration flags (e.g., which model to use for the query). The cloud generates a prompt based on the metadata, the input and the processed webpage or application content and provides the prompt, the input, and the processed webpage or application content to an LLM. The LLM generates an LLM response based on the provided prompt, input, and processed webpage or application content. The LLM response map one or more variables included in the input to one or more corresponding elements associated with the webpage or application content. The LLM response is received and compared to the inference pattern engine response. A correctness of the prediction is determined. In some embodiments, the prediction is correct, that is, the inference pattern engine correctly mapped all of the one or more variables included in the input to nodes in the new version of the tree data structure. The derived pattern from the previous iteration is maintained and an indication of the determined correctness is stored.

In some embodiments, the prediction is partially correct, that is, the inference pattern engine correctly mapped some of the one or more variables included in the input to nodes in the new version of the tree data structure. In some embodiments, the prediction is greater than or equal to a confidence threshold (e.g., 95% accurate). In such embodiments, the derived pattern from the previous iteration is maintained and an indication of the determined correctness is stored. In some embodiments, the prediction is less than a confidence threshold. In such embodiments, a new pattern is derived and stored. An indication of the determined correctness may be stored with the new derived pattern.

In some embodiments, the prediction is incorrect, that is, the inference pattern engine incorrectly mapped all of the one or more variables included in the input to nodes in the new version of the tree data structure. In such embodiments, a new pattern is derived and stored. An indication of the determined correctness may be stored with the new derived pattern.

After a plurality of iterations, the inference pattern engine is trained based on the plurality of LLM responses and can correctly map the one or more variables included in the input to one or more nodes in a new version of a tree data structure. Such a mapping has a confidence score that is greater than or equal to a confidence threshold. Instead of utilizing the LLM to generate the LLM response, the inference pattern engine obtains the derived pattern from a previous iteration and utilizes the obtained pattern to generate an inference pattern engine response that maps the one or more variables included in the input corresponding to one or more corresponding elements associated with the webpage or application content to one or more nodes in a new version of a tree data structure. The inference pattern engine provides the inference pattern engine response to a client device or runtime agent.

As a result, the generated output is less likely to contain hallucinations since the LLM is not responsible for generating the response. Furthermore, the response time for a client device or runtime agent to receive an answer is significantly reduced (e.g., from seconds to milliseconds) because the LLM does not need to be prompted.

FIG. 4A is a block diagram illustrating a system to generate an adaptable script to automate a task associated with a webpage in accordance with some embodiments. In the example shown, system 400 includes a client device 402, a cloud service 412, a LLM 422, and an inference patterns store 432. Client device 402 may be a computer, a laptop, a desktop, a server, a tablet, a smart device, or any other computing device. Client device 402 includes browser/app 404. Browser/app 404 is configured to retrieve one or more webpages from the Internet.

Browser/app 404 is configured to receive an input associated with a webpage. In some embodiments, the input is a query associated with a webpage. In some embodiments, the input is freeform text associated with a webpage.

Code associated with SDK client 406 is included in browser/app 404. SDK client 406 is configured to capture content associated with a webpage, process the content associated with the webpage into a specific format, and provide the processed content to cloud service 412. SDK client 406 includes functionality to interact with the annotated version of the web elements (e.g., the query response). SDK client 406 provides API(s) that enable actions, such as client, input, etc., to be performed. SDK client 406 is configured to provide error handling. An instruction step associated with a web automation solution may have an error handler. SDK client 406 is configured to cache a corresponding response for an instruction step for investigation and logging. In the event of an instruction execution failure not caused by web page changes, SDK client 406 is configured to continue and retry a script from a failed step without having to rerun prior steps. This ensures the scripting environment won't execute the same command or perform the same action repeatedly, especially for transaction-related tasks.

SDK client 406 is configured to determine, for a particular web element, a corresponding "role," a corresponding "name," and a corresponding "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

SDK client 406 is configured to request cloud service 412 to generate a response by providing to cloud service 412, via connection 410, the processed webpage content and the received input. Connection 410 may be a wired or wireless connection. Connection 410 may be the Internet, an intranet, a wireless area network, a personal area network, a wireless local area network, a virtual private network, etc.

Cloud service 412 includes inference pattern engine 414. For an initial iteration, associated with the webpage, inference pattern engine 414 utilizes the processed webpage content and the received query to generate a prompt for LLM 422. In some embodiments, LLM 422 is part of cloud service 412. In some embodiments, LLM 422 is a separate entity from cloud service 412. The notations for each element included in the processed webpage content help LLM 422 to determine the purpose of the elements. LLM 422 is trained to understand the semantics of web content. The prompt, the query, and the processed webpage content are provided to LLM 422 via connection 420. Connection 420 may be a wired or wireless connection. Connection 420 may be the Internet, an intranet, a wireless area network, a personal area network, a wireless local area network, a virtual private network, etc.

In response, LLM 422 generates a response. The LLM response is an annotated representation of web elements as specified in the query. The LLM response maps a variable included in the query to a corresponding webpage element included in the processed webpage content. This LLM response is designed to be user-friendly and easy to understand, in contrast to traditional HTML. It enhances the accessibility of web pages, allowing users to interact with the specified web elements as described in the LLM response. In addition to providing, for a particular web element, a corresponding "role," a corresponding "name," and a corresponding "html_tag," the LLM response also includes a corresponding "identifier" for the particular web element. The identifier denotes a specified identifier for a given web element. Instead of using the specified identifier for a particular web element, a developer may utilize a variable included in the input that corresponds to the particular web element to generate the script to automate a task associated with the webpage. LLM 412 provides the LLM response to cloud service 412. Cloud service 412 is configured to provide the LLM response to client SDK 406. Client SDK 406 includes application programming interface(s) (APIs) that enables object-oriented programming interfaces to be generated based on the LLM response or inference pattern engine response. The APIs provide various functionality to interact with the web elements. The APIs are supported by one or more programming languages, such as Python, JavaScript, etc. Users associated with a client device may utilize the APIs to create web automation solutions for a wide range of everyday applications.

Inference pattern engine 414 derives a pattern from the LLM response to map the one or more variables included in the input to one or more corresponding elements associated with the webpage. In some embodiments, inference pattern engine 414 derives the pattern before providing the LLM response to client device 402. In some embodiments, inference pattern engine 414 provides the LLM response to client device 412 while deriving the pattern. In some embodiments, inference pattern engine 414 derives the pattern after providing the LLM response to client device 402.

In some embodiments, to derive the pattern, inference pattern engine 414 determines a plurality of beacon nodes associated with a tree data structure. The webpage has an associated tree data structure (e.g., document object model (DOM) tree). The tree data structure associated with a webpage may be a dynamic tree data structure. That is, each time the webpage is accessed, the corresponding tree data structure is different. However, a beacon node in a tree data structure is unique because it has a set of attributes (i.e., a fingerprint) that only maps to one element in the tree data structure, regardless of the tree data structure version. Examples of beacon nodes include a node that corresponds to a search box, a node that corresponds to a filter element on a left side of a webpage or application, a node that corresponds to a sponsored product element on a webpage or application.

Inference pattern engine 414 utilizes the paths associated with the plurality of beacon nodes (e.g., three beacon nodes) to map the one or more variables included in the input to one or more corresponding elements associated with the processed webpage content. A variable included in the input has a corresponding path in the tree data structure. Inference pattern engine 414 determines the corresponding paths from the plurality of beacon nodes to a target node corresponding to the variable included in the input (e.g., triangulation) and stores the determined paths in inference patterns store 432. For example, a variable included in the input may correspond to a login button (e.g., FIG. 1B). The corresponding paths from a plurality of beacons nodes to a node in the tree data structure corresponding to the login button (as indicated by the mapping generated by the LLM) is determined by inference pattern engine 414 and stored in inference patterns store 432 via connection 430. Connection 430 may be a wired or wireless connection. Connection 430 may be the Internet, an intranet, a wireless area network, a personal area network, a wireless local area network, a virtual private network, etc. In some embodiments, inference patterns store 432 is included in a storage device that is local to or remote from cloud service 412. The query response preserves the mapping of response nodes to their corresponding HTML elements via XPaths, DOM attributes and other distinctive patterns for identifying HTML elements within a webpage. Storing the inference patterns in the inference patterns store enables the cloud service to generate the query response for the same query and similar webpage without prompting LLM 422 to generate the same query response on CPU instances. This reduces latency and GPU costs associated with utilizing LLM 422 to generate the input response.

For one or more subsequent iterations (similar requests to the initial request), inference pattern engine 414 obtains a derived pattern stored in inference pattern store 432 and utilizes the stored derived pattern to generate an inference pattern engine response. Based on the stored derived pattern, inference pattern engine 414 maps the one or more variables included in the input to one or more corresponding elements associated with the webpage. Inference pattern engine 414 identifies the plurality of beacon nodes in the new version of the tree data structure. Inference pattern engine 414 identifies the plurality of beacon nodes in the new version of the tree data structure. Inference pattern engine 414 utilizes the corresponding stored paths from the plurality of beacon nodes to the one or more target nodes in the previous version of the tree data structure to predict the current paths from the plurality of beacon nodes in the new version of the tree data structure to the one or more target nodes in the new version of the tree data structure.

Inference pattern engine 414 provides metadata to cloud service 412. Examples of metadata include a post-processed HTML element tree, the query, the type of data that is to be extracted from the LLM, and/or configuration flags (e.g., which model to use for the query). Cloud service 412 generates a prompt based on the metadata, the input and the processed webpage content and provides the prompt, the input, and the processed webpage content to LLM 422. LLM 422 generates an LLM response based on the provided prompt, input, and processed webpage content. The LLM response maps one or more variables included in the input to one or more corresponding elements associated with the webpage. Inference pattern engine 414 receives the LLM response from LLM 422 and compares the LLM response to the inference pattern engine response. A correctness of the prediction is determined. In some embodiments, the prediction is correct, that is, inference pattern engine 414 correctly mapped all of the one or more variables included in the input to nodes in the new version of the tree data structure. The derived pattern from the previous iteration is maintained and an indication of the determined correctness is stored in inference patterns store 432.

In some embodiments, the prediction is partially correct, that is, inference pattern engine 414 correctly mapped some of the one or more variables included in the input to nodes in the new version of the tree data structure. In some embodiments, the prediction is greater than or equal to a confidence threshold (e.g., 95% accurate). In such embodiments, the derived pattern from the previous iteration is maintained and an indication of the determined correctness is stored in inference patterns store 432. In some embodiments, the prediction is less than a confidence threshold. In such embodiments, a new pattern is derived and stored in inference patterns store 432. An indication of the determined correctness may be stored with the new derived pattern.

In some embodiments, the prediction is incorrect, that is, inference pattern engine 414 incorrectly mapped all of the one or more variables included in the input to nodes in the new version of the tree data structure. In such embodiments, a new pattern is derived and stored in inference patterns store 432. An indication of the determined correctness may be stored with the new derived pattern.

After a plurality of iterations, inference pattern engine 414 is trained based on the plurality of LLM responses and can correctly map the one or more variables included in the input to one or more nodes in a new version of a tree data structure. Such a mapping has a confidence score that is greater than or equal to a confidence threshold. Instead of utilizing LLM 422 to generate the LLM response, inference pattern engine 414 obtains the derived pattern from a previous iteration stored in inference patterns store 432 and utilizes the obtained pattern to generate an inference pattern engine response that maps the one or more variables included in the input to one or more nodes in a new version of a tree data structure. Cloud service 412 provides the inference pattern engine response to client device 402 via browser/app 404.

As a result, the generated output is less likely to contain hallucinations since LLM 422 is not responsible for generating the response. Furthermore, the response time for client device 422 to receive an answer is significantly reduced (e.g., from seconds to milliseconds) because LLM 422 does not need to be prompted.

Figure 4B:
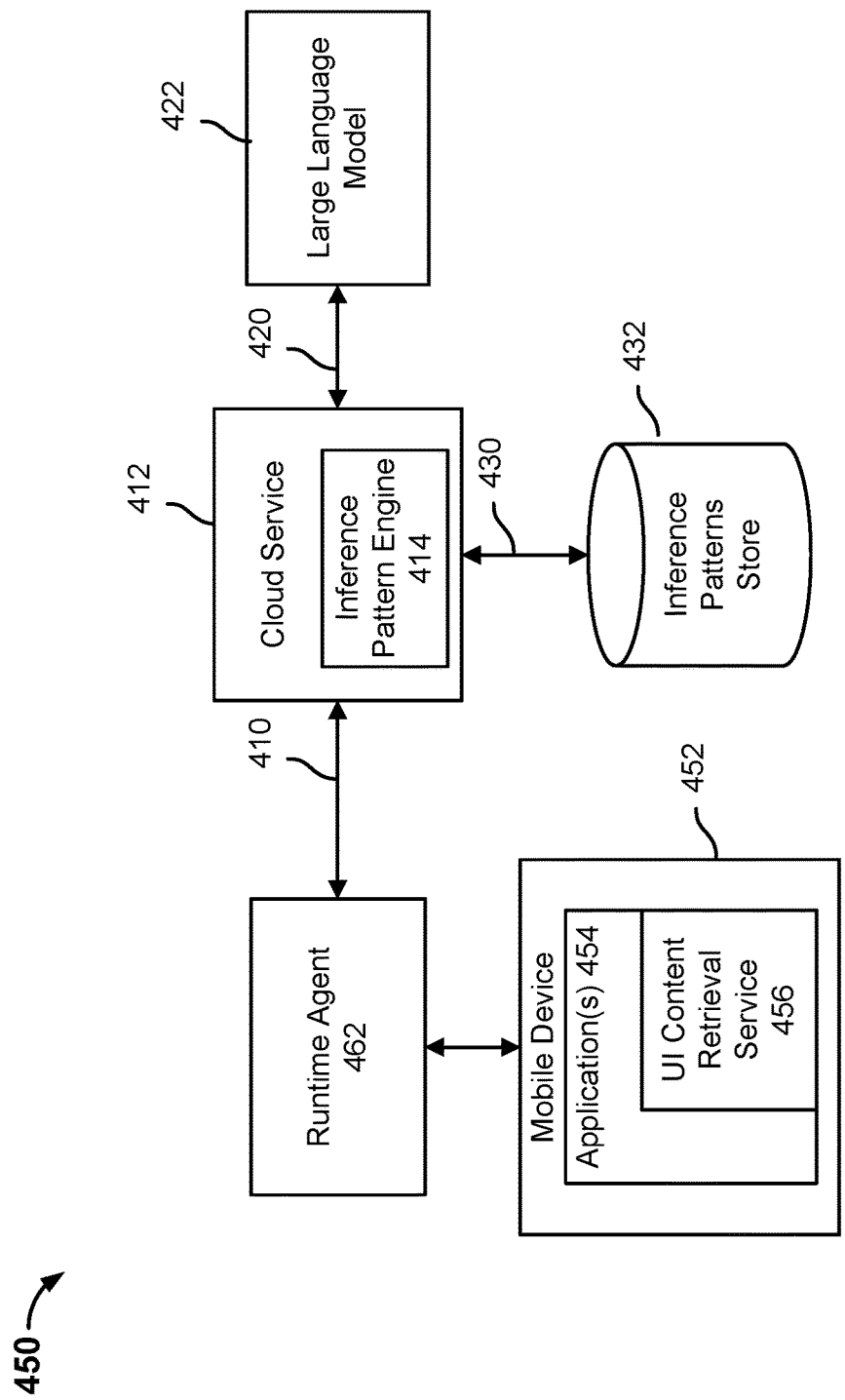
FIG. 4B is a block diagram illustrating a system to generate an adaptable script to automate a task associated with an application in accordance with some embodiments.

FIG. 4B is a block diagram illustrating a system to generate an adaptable script to automate a task associated with an application in accordance with some embodiments. In the example shown, system 450 includes a mobile device 452, a cloud service 412, a LLM 422, and an inference patterns store 432. Mobile device 452 may be a smart phone, a tablet, a handheld gaming device, a virtual reality headset, or any other portable computing device. In some embodiments, mobile device 452 is a client device, such as client device 402. Mobile device 452 includes one or more applications 454. Mobile device 452 is configured to receive an input from a user associated with mobile device 452. In some embodiments, the input is a query associated with an application. In some embodiments, the input is freeform text associated with an application.

The one or more applications 454, when executed by mobile device 452, have an associated UI that is viewable by a user associated with mobile device 452. The UI associated with the one or more applications have UI content, such as UI layout information and screen content, that is not easily accessible by the user associated with mobile device 452.

UI content retrieval service 456 is installed on mobile device 452 to enable the user associated with mobile device 452 to access the UI content associated with the one or more applications 454. UI content retrieval service 456 is configured to extract UI content from a UI associated with the one or more applications 454. In some embodiments, UI content retrieval service 456 is configured to extract UI content associated with an application that is running in the foreground of a display of mobile device 452. In some embodiments, UI content retrieval service 456 is configured to extract UI content associated with an application that is running in a background of the display of mobile device 452. UI content may include a UI layout, screen content, a screenshot, etc. In some embodiments, UI content retrieval service 456 is located on a separate device that communicates (wired or wirelessly) with client device 452. The wired connection may be a USB cable, lightning cable, or other type of mobile device cable. The wireless connection may be a Bluetooth connection, a Wi-Fi connection, an Airdrop connection, or other type of wireless connection.

Runtime agent 462 is configured to obtain the extracted UI content from UI content retrieval service 456 and process the obtained UI content into a consumable format (e.g., Javascript Object Notation (JSON), Extensible Markup Language (XML), screenshot, etc.). Runtime Agent 462 is configured to package the processed UI content with a user input and provide the packaged information as a request to cloud service 412. Runtime agent 462 is also configured to facilitate further communication with mobile device 452 (e.g., interacting with UI elements for automation purposes).

In some embodiments, runtime agent 462 is located on a device separate from mobile device 452, such as a client device. In some embodiments, runtime agent 462 is also installed on mobile device 452. In some embodiments, runtime agent 462 is installed on mobile device 452 as an application separate from UI content retrieval service 456. It is possible that in some embodiments, runtime agent 462 is installed on mobile device 452 in a same application as UI content retrieval service 456. However, it is desired to deploy UI content retrieval service 456 and runtime agent 462 across a plurality of devices in a uniform manner to reduce the amount of time and resources associated with debugging an error in UI content retrieval service 456 and/or runtime agent 462. For example, a standalone version of UI content retrieval service 456 and a version of UI content retrieval service 456 packaged with runtime agent 462 may be deployed. However, in the event there is a bug with UI content retrieval service 456, more time and resources are needed to debug both versions of UI content retrieval service 456 when compared to debugging either the standalone version of UI content retrieval service 456 or the version of UI content retrieval service 456 packaged with runtime agent 462.

In response to receiving the input and the packaged information, cloud service 412 includes inference pattern engine 414. For an initial iteration associated with application 454, cloud service 412 utilizes the packaged information to generate a prompt for LLM 422. In some embodiments, LLM 422 is part of cloud service 412. In some embodiments, LLM 422 is a separate entity from cloud service 412.

The notations for each element included in the processed content help LLM 422 to determine the purpose of the elements. LLM 422 is trained to understand the semantics of UI content. The prompt, the input, and the processed UI content are provided to LLM 422 via connection 420. Connection 420 may be a wired or wireless connection. Connection 420 may be the Internet, an intranet, a wireless area network, a personal area network, a wireless local area network, a virtual private network, etc.

In response, LLM 422 generates a response and provide the LLM response to inference pattern engine 414. The LLM response is an annotated representation of application elements as specified in the input. The LLM response maps a variable included in the input to a corresponding UI element. The LLM response enhances the accessibility of application UIs, allowing users to interact with the specified elements as described in the LLM response. In addition to providing, for a particular element, a corresponding "role," a corresponding "name," and a corresponding "html_tag," the LLM response also includes a corresponding "identifier" and a corresponding "bounds" for the particular UI element. The identifier denotes a specified identifier for a given element. Instead of using the specified identifier for a particular UI element, a developer may utilize a variable included in the input that corresponds to the particular UI element to generate the script to automate a task associated with the application. The "bounds" value indicates a position or location of the particular element on a UI associated with the application.

Inference pattern engine 414 derives a pattern from the LLM response to map the one or more variables included in the input to one or more corresponding elements associated with application 454. In some embodiments, inference pattern engine 414 derives the pattern before providing the LLM response to runtime agent 462. In some embodiments, inference pattern engine 414 provides the LLM response to runtime agent 462 while deriving the pattern. In some embodiments, inference pattern engine 414 derives the pattern after providing the LLM response to runtime agent 462.

In some embodiments, to derive the pattern, inference pattern engine 414 determines a plurality of beacon nodes associated with a tree data structure. The application UI has an associated tree data structure. The tree data structure associated with the UI may be a dynamic tree data structure. That is, each time the application is accessed, the corresponding tree data structure is different. However, a beacon node in a tree data structure is unique because it has a set of attributes (i.e., a fingerprint) that only maps to one element in the tree data structure, regardless of the tree data structure version. Examples of beacon nodes include a node that corresponds to a search box, a node that corresponds to a filter element on a left side of a webpage or application, a node that corresponds to a sponsored product element on a webpage or application.

Inference pattern engine 414 utilizes the paths associated with the plurality of beacon nodes (e.g., three beacon nodes) to map the one or more variables included in the input to one or more corresponding elements associated with the processed application content. A variable included in the input has a corresponding path in the tree data structure. Inference pattern engine 414 determines the corresponding paths from the plurality of beacon nodes to a node corresponding to the variable included in the input (e.g., triangulation) and stores the determined paths in inference patterns store 432. For example, a variable included in the input may correspond to a login button (e.g., FIG. 1B). The corresponding paths from a plurality of beacons nodes to a node in the tree data structure corresponding to the login button (as indicated by the mapping generated by the LLM) is determined by inference pattern engine 414 and stored in inference patterns store 432 via connection 430. Connection 430 may be a wired or wireless connection. Connection 430 may be the Internet, an intranet, a wireless area network, a personal area network, a wireless local area network, a virtual private network, etc. In some embodiments, inference patterns store 432 is included in a storage device that is local to or remote from cloud service 412.

Cloud service 412 is configured to provide the LLM response to runtime agent 462, which uses the information in the LLM response to locate certain UI elements on a screen associated with an application 454 running on mobile device 452 and to interact with them to perform automation actions. Given the response from cloud service 412, runtime agent 462 is configured to facilitate interaction with UI elements by sending corresponding commands to mobile device 452 through a wired or wireless connection.

For one or more subsequent iterations (similar requests to the initial request), inference pattern engine 414 obtains a derived pattern stored in in inference pattern store 432 and utilizes the stored derived pattern to generate an inference pattern engine response. Based on the stored derived pattern, inference pattern engine 414 maps the one or more variables included in the input to one or more corresponding elements associated with the application UI. Inference pattern engine 414 identifies the plurality of beacon nodes in the new version of the tree data structure. Inference pattern engine 414 identifies the plurality of beacon nodes in the new version of the tree data structure. Inference pattern engine 414 utilizes the corresponding stored paths from the plurality of beacon nodes to the one or more target nodes in the previous version of the tree data structure to predict the current paths from the plurality of beacon nodes in the new version of the tree data structure to the one or more target nodes in the new version of the tree data structure.

Inference pattern engine 414 generates metadata. Examples of metadata include a post-processed UI element tree, the query, the type of data that is to be extracted from the LLM, and/or configuration flags (e.g., which model to use for the query). Cloud service 412 generates a prompt based on the metadata, the input, and the processed application content and provides the prompt, the input, and the processed application content to LLM 422. LLM 422 generates a response based on the provided prompt, input, and processed application content. The LLM response maps one or more variables included in the input to one or more corresponding elements associated with the application UI. Inference pattern engine 414 receives the LLM response from LLM 422 and compares the LLM response to the inference pattern engine response. A correctness of the prediction is determined. In some embodiments, the prediction is correct, that is, inference pattern engine 414 correctly mapped all of the one or more variables included in the input to nodes in the new version of the tree data structure. The derived pattern from the previous iteration is maintained and an indication of the determined correctness is stored in inference patterns store 432.

In some embodiments, the prediction is partially correct, that is, inference pattern engine 414 correctly mapped some of the one or more variables included in the input to nodes in the new version of the tree data structure. In some embodiments, the prediction is greater than or equal to a confidence threshold (e.g., 95% accurate). In such embodiments, the derived pattern from the previous iteration is maintained and an indication of the determined correctness is stored in inference patterns store 432. In some embodiments, the prediction is less than a confidence threshold. In such embodiments, a new pattern is derived and stored in inference patterns store 432. An indication of the determined correctness may be stored with the new derived pattern.

In some embodiments, the prediction is incorrect, that is, inference pattern engine 414 incorrectly mapped all of the one or more variables included in the input to nodes in the new version of the tree data structure. In such embodiments, a new pattern is derived and stored in inference patterns store 432. An indication of the determined correctness may be stored with the new derived pattern.

After a plurality of iterations, inference pattern engine 414 is trained based on the plurality of LLM responses and can correctly map the one or more variables included in the input to one or more nodes in a new version of a tree data structure. Such a mapping has a confidence score that is greater than or equal to a confidence threshold. Instead of utilizing LLM 422 to generate the LLM response, inference pattern engine 414 obtains the derived pattern from a previous iteration stored in inference patterns store 432 and utilizes the obtained pattern to generate an inference pattern engine response that maps the one or more variables included in the input to one or more nodes in a new version of a tree data structure. Inference pattern engine 414 provides the inference pattern engine response to runtime agent 462, which uses the information in the inference pattern engine response to locate certain UI elements on a screen associated with an application 454 running on mobile device 452 and to interact with them to perform automation actions.

As a result, the generated output is less likely to contain hallucinations since LLM 422 is not responsible for generating the response. Furthermore, the response time for client device 422 to receive an answer is significantly reduced (e.g., from seconds to milliseconds) because LLM 422 does not need to be prompted.

Figure 5A:
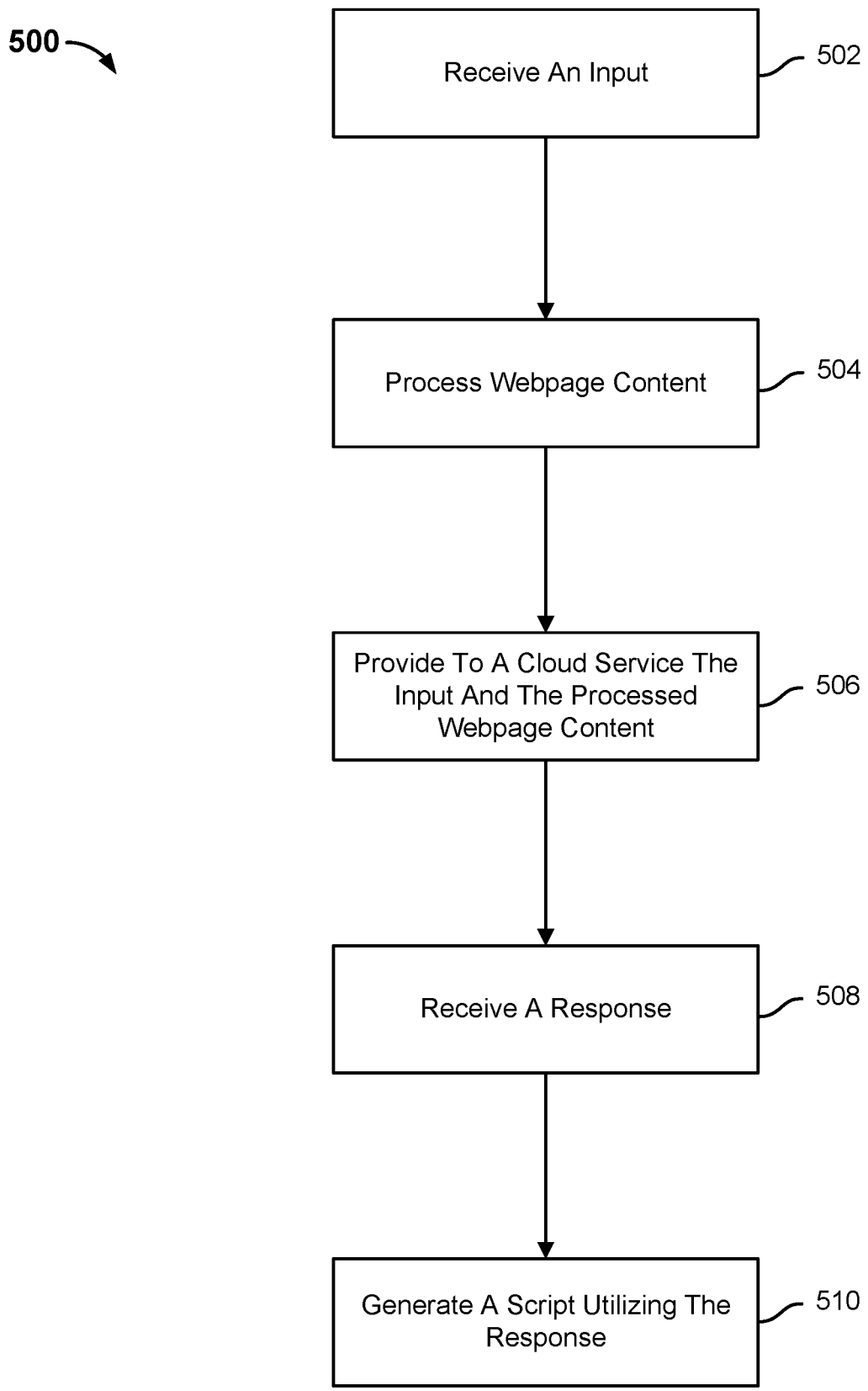
FIG. 5A is a flow diagram illustrating a process to generate an adaptable script to automate a task associated with a webpage in accordance with some embodiments.

FIG. 5A is a flow diagram illustrating a process to generate an adaptable script to automate a task associated with a webpage in accordance with some embodiments. In the example shown, process 500 may be implemented by a client SDK, such as client SDK 406.

At 502, an input is received. In some embodiments, the input is a query. The query is a structured request, formulated in natural language, for specific web elements from a webpage. The query serves as a representation to extract precise information from the webpage. The query is structured in a manner that signifies a relationship between a component and the webpage. The query is comprised of one or more variables that correspond to one or more specific web elements associated with a webpage. The query is designed to be versatile across different types of websites.

In some embodiments, the input is a freeform input.

At 504, webpage content is processed. The processed webpage is a human-friendly representation of the HMTL associated with the webpage, with notations for each element. For a particular web element, the processed webpage content indicates a "role," a "name," and an "html_tag." The "role" is a parameter that describes the role of the particular web element in an accessibility tree. The "name" is a parameter that represents the name of the web element as specified in the original webpage accessibility tree. The "html_tag" is a parameter that denotes the original html tag of the web element.

At 506, the input and the processed webpage content are provided to a cloud service.

At 508, a response is received from the cloud service. In some embodiments, the response is an LLM response. In some embodiments, the response is an inference pattern engine response. The response is a structured representation of specified web element nodes. The response maps a variable included in the input to a corresponding webpage element included in the processed webpage content.

At 510, an automated task is generated utilizing the response. Code associated with the automated task is generated utilizing the variables included in the input. For example, an automated task may include booking a flight on a travel website, purchasing a product on an e-commerce website, scheduling an appointment at a medical facility, etc. The variables "login_btn," "search_box," and "search_btn" from FIG. 1A may be utilized instead of "tf_22," "APjFqB," and "tf_194," respectively.

In the event an identifier associated with a web element changes due to an update in the web page, an automated task may not function properly because a variable included in the script is not correctly mapped to the correct web element. Steps 504-508 may be repeated to enable the LLM to determine a new mapping between the updated web element identifier and the variable included in the query. For example, the response may map the variable "login_btn" to a web element having an identifier of "identifier_1." The web page may be updated such that the web element having the identifier of "identifier_1" now has an identifier of "identifier_2." Process 500 may be repeated to enable the LLM to update the mapping such that the variable "login_btn" is mapped to the web element having the identifier of "identifier_2."

In some embodiments, steps 504-508 are periodically performed (e.g., daily, weekly, monthly, etc.). In some embodiments, steps 504-508 are performed in response to a user command. In some embodiments, steps 504-508 are performed as a background process.

Instead of having a developer debug the script line-by-line to determine which web element identifier has changed, implementing the LLM significantly reduces the time and resources needed to debug a nonfunctional script or to generate a new script. The LLM can effortlessly map the one or more variables included in the query to the one or more web elements included in the processed webpage content since the LLM is trained to understand the semantics of web content.

Figure 5B:
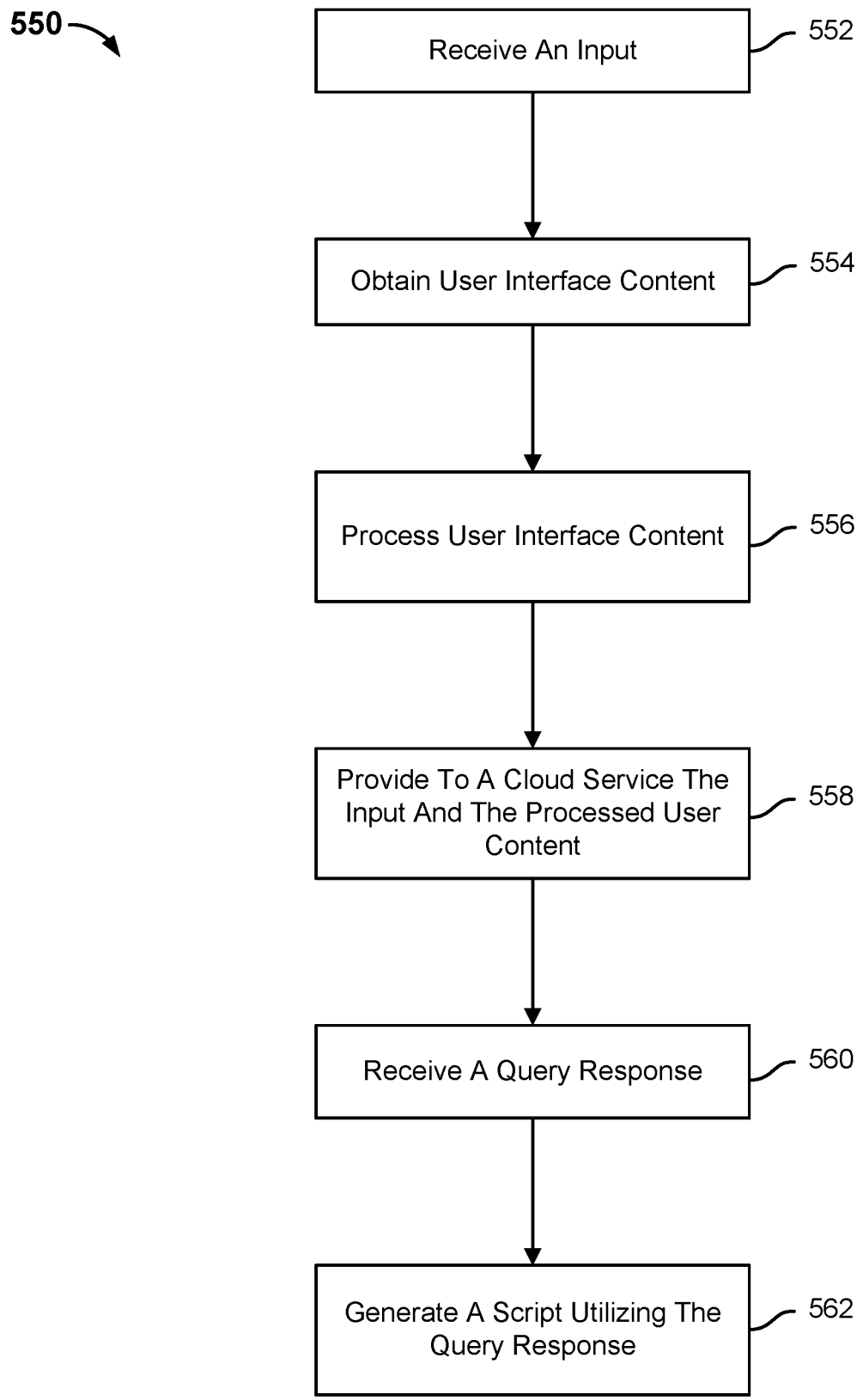
FIG. 5B is a flow diagram illustrating a process to generate an adaptable script to automate a task associated with an application in accordance with some embodiments.

FIG. 5B is a flow diagram illustrating a process to generate an adaptable script to automate a task associated with an application in accordance with some embodiments. In the example shown, process 550 may be implemented by a runtime agent, such as runtime agent 462.

At 552, an input is received. In some embodiments, the input is a query. The query is a structured request, formulated in natural language, for specific web elements from an application. The query serves as a representation to extract precise information from the application. The query is structured in a manner that signifies a relationship between a component and the application. The query is comprised of one or more variables that correspond to one or more specific UI elements associated with the application. The query is designed to be versatile across different types of applications.

In some embodiments, the input is a freeform input.

At 554, UI content associated with an application running on a mobile device is obtained. The application has an associated UI that is viewable by a user associated with the mobile device. The UI has associated content that may not be easily accessible by the user associated with the mobile device. A UI content retrieval service is installed on the mobile device to obtain the UI content associated with the application. The UI content may include a UI layout, screen content, a screenshot, etc. The UI content retrieval service provides the obtained screen content to a runtime agent.

At 556, the obtained UI content is processed into a consumable format. The runtime agent processes the obtained UI content into a consumable format, such as JSON, XML, a screenshot, etc. In some embodiments, the consumable format is pre-defined. In some embodiments, the obtained screen content is processed into a consumable format based on a type of task that is to be automated.

At 558, the input and the processed screen content is provided to a cloud service.

At 560, a response is received from the cloud service. In some embodiments, the response is an LLM response. In some embodiments, the response is an inference pattern engine response. The response is a structured representation of specified UI element nodes. The response maps a variable included in the input to a corresponding UI element included in the processed user interface content.

At 562, a script for an automated task is generated utilizing the response. Code associated with the automated task is generated utilizing the variables included in the input. For example, an automated task may include finding the cheapest ride between multiple ride-sharing apps, accepting requests on a social media platform from users that meet certain criteria, purchasing an item from an e-commerce platform when it is below a certain price, etc.). The variables "Login," "Tap to search," and "Search" from FIG. 2B may be utilized instead of "32," "34," and "35," respectively.

Figure 6:
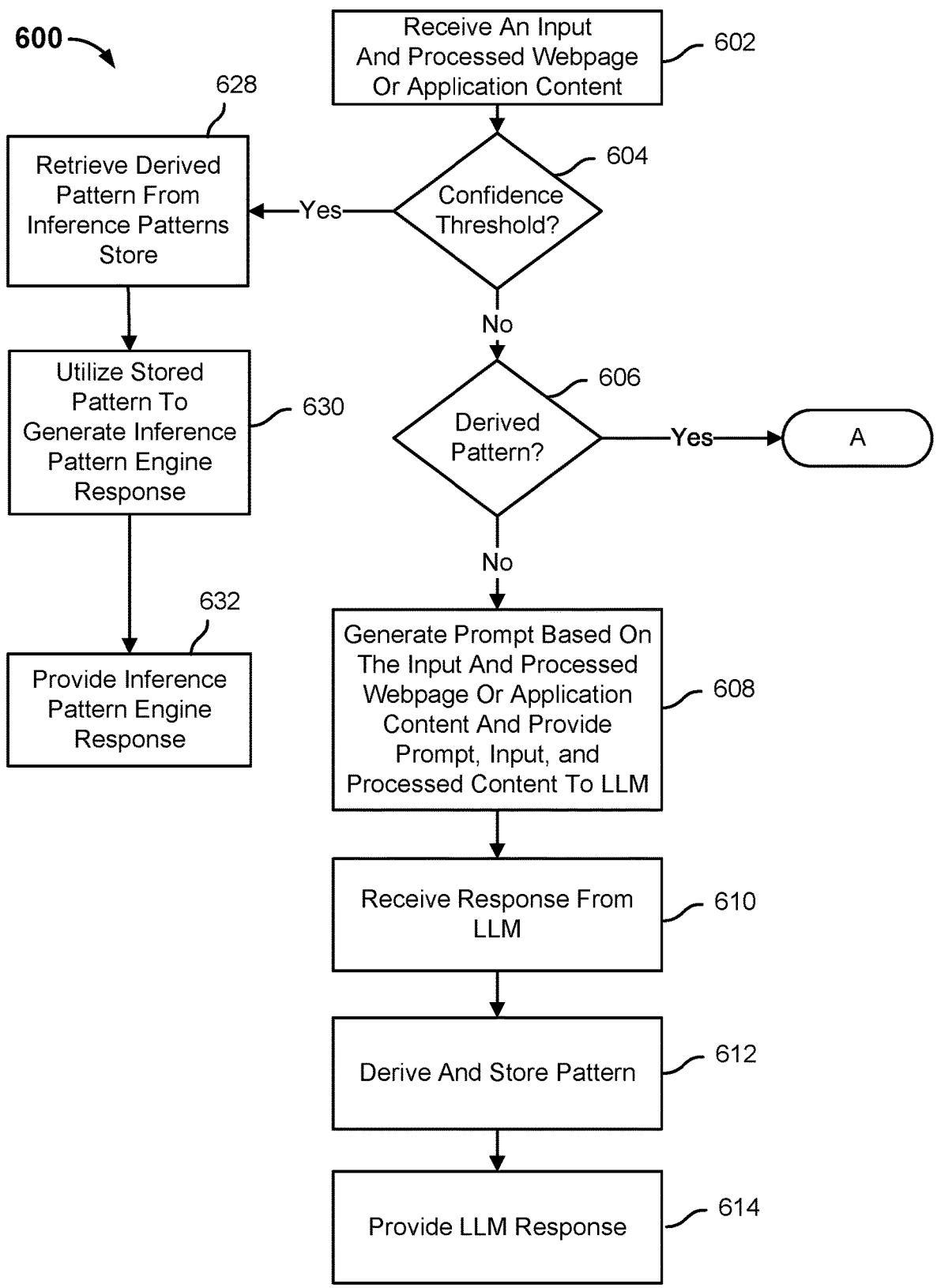
FIG. 6 is a flow diagram illustrating a process to provide a response in accordance with some embodiments.
Figure 6:
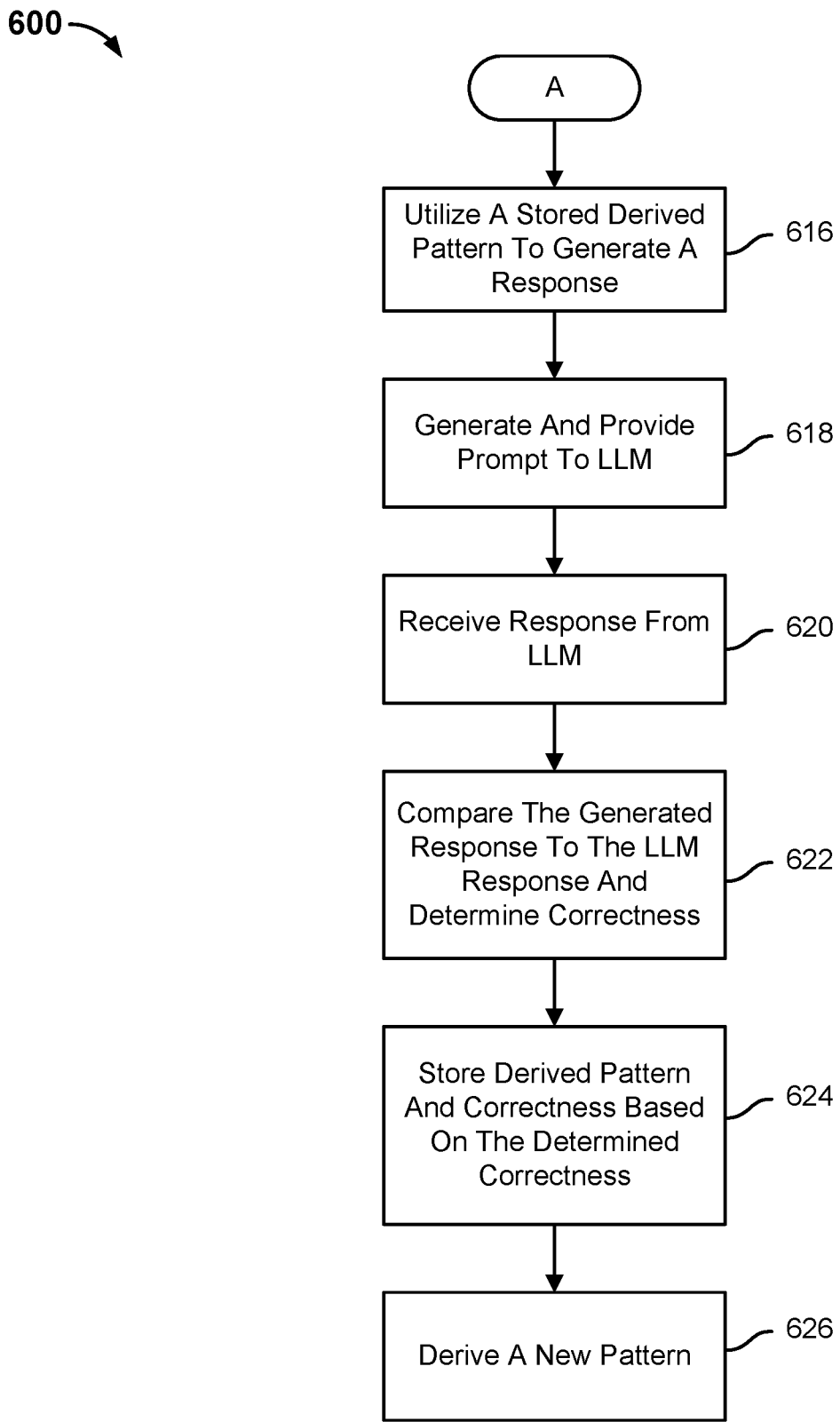

FIG. 6 is a flow diagram illustrating a process to provide a response in accordance with some embodiments. In the example shown, process 600 may be implemented by a cloud service, such as cloud service 412. Parts of process 600 are performed by an inference pattern engine included in the cloud service, such as inference pattern engine 414.

At 602, an input, and processed webpage or application content are received.

At 604, it is determined whether a confidence threshold has been reached for the webpage or application. A confidence threshold has been reached when the inference pattern engine is capable of mapping correctly greater than or equal to a confidence threshold one or more variables in the input to one or more corresponding elements in the processed webpage or application content.

In response to a determination that a confidence threshold has not been reached for the webpage or application, process 600 proceeds to 606. In response to a determination that the confidence threshold has been reached for the webpage or application, process 600 proceeds to 628.

At 606, it is determined whether a derived pattern associated with the webpage or application is stored. In response to a determination that a derived pattern associated with the webpage or application is not stored (e.g., this is the initial request for a mapping associated with the webpage or application), process 600 proceeds to 608. In response to a determination that a derived pattern associated with the webpage or application is stored (e.g., this is a subsequent request for a mapping associated with the webpage or application), process 600 proceeds to 616.

At 608, a prompt based on the input and processed webpage content or application is generated. The prompt, the input, and the processed webpage content or application are provided to the LLM. An example of a generated prompt is:

You are an expert in understanding the structure of the web page. You will be given a simplified Web Page accessibility tree (created following Aria spec) and a GraphQL-like query that is supposed to query various web page elements. Provide a hypothetical response to such a query in a GraphQL-like response format. Return only response in the following format:

{
　　{response}
}

At 610, a response is received from the LLM. The LLM response is a structured representation of specified element nodes. The LLM response maps a variable included in the input to a corresponding element included in the processed webpage content or processed UI content. For each element, the query response may indicate a "role," a "name," an "id," and/or an "html_tag."

At 612, a pattern is derived based on the LLM response and stored. The inference pattern engine derives a pattern from the LLM response to map the one or more variables included in the input to one or more corresponding elements associated with the webpage or application content. In some embodiments, the inference pattern engine determines a plurality of beacon nodes associated with a tree data structure. In some embodiments, the tree data structure is associated with a webpage (e.g., DOM tree). In some embodiments, the tree data structure is associated with a user interface tree (e.g., the user interface tree of FIG. 1C). The tree data structure associated with a webpage or a user interface tree may be a dynamic tree data structure. That is, each time the webpage or user interface is accessed, the corresponding tree data structure is different, regardless of the tree data structure version. However, a beacon node in a tree data structure is unique because it has a set of attributes (i.e., a fingerprint) that only maps to one element in the tree data structure. Examples of beacon nodes include a node that corresponds to a search box, a node that corresponds to a filter element on a left side of a webpage or application, a node that corresponds to a sponsored product element on a webpage or application.

The paths associated with the plurality of beacon nodes (e.g., three beacon nodes) are utilized to map the one or more variables included in the input to one or more corresponding elements associated with the webpage or application content. A target node corresponding variable included in the input has a corresponding path in the tree data structure. The corresponding paths from the plurality of beacon nodes to the target node corresponding to the variable included in the input are determined (e.g., triangulation) and stored. For example, a variable included in the input may correspond to a login button. The corresponding paths from a plurality of beacons nodes to a node in the tree data structure corresponding to the login button (as indicated by the mapping generated by the LLM) is stored.

At 614, the LLM response is provided. In some embodiments, the LLM response is provided to a client device. In some embodiments, the LLM response is provided to a runtime agent.

At 616, a derived pattern is utilized to generate an inference pattern engine response. Based on a stored derived pattern, the inference pattern engine response maps the one or more variables included in the input to one or more corresponding elements associated with the webpage or application content. The inference pattern engine identifies the plurality of beacon nodes in the new version of the tree data structure. The inference pattern engine identifies the plurality of beacon nodes in the new version of the tree data structure. The inference pattern engine utilizes the corresponding stored paths from the plurality of beacon nodes to the one or more target nodes in the previous version of the tree data structure to predict the current paths from the plurality of beacon nodes in the new version of the tree data structure to the one or more target nodes in the new version of the tree data structure.

At 618, a prompt is generated based on the input and processed webpage or application content and provided to an LLM. The prompt may be similar to the prompt provided at 608.

At 620, a response is received from the LLM. The LLM response maps one or more variables included in the input to one or more corresponding elements associated with the webpage or application content.

At 622, the inference pattern engine response is compared to the LLM response and a correctness is determined. In some embodiments, the prediction is correct, that is, the inference pattern engine correctly mapped all of the one or more variables included in the input to nodes in the new version of the tree data structure.

In some embodiments, the prediction is partially correct, that is, the inference pattern engine correctly mapped some of the one or more variables included in the input to nodes in the new version of the tree data structure. In some embodiments, the prediction is greater than or equal to a confidence threshold (e.g., 95% accurate). In some embodiments, the prediction is less than a confidence threshold.

In some embodiments, the prediction is incorrect, that is, the inference pattern engine incorrectly mapped all of the one or more variables included in the input to nodes in the new version of the tree data structure.

At 624, the derived pattern and a correctness associated with the derived pattern is stored based on the determined correctness.

In some embodiments, the prediction is correct, that is, the inference pattern engine correctly mapped all of the one or more variables included in the input to nodes in the new version of the tree data structure. The derived pattern from the previous iteration is maintained and an indication of the determined correctness is stored.

In some embodiments, the prediction is partially correct, that is, the inference pattern engine correctly mapped some of the one or more variables included in the input to nodes in the new version of the tree data structure. In some embodiments, the prediction is greater than or equal to a confidence threshold (e.g., 95% accurate). In such embodiments, the derived pattern from the previous iteration is maintained and an indication of the determined correctness is stored. In some embodiments, the prediction is less than a confidence threshold. In such embodiments, a new pattern is derived and stored. An indication of the determined correctness may be stored with the new derived pattern.

In some embodiments, the prediction is incorrect, that is, the inference pattern engine incorrectly mapped all of the one or more variables included in the input to nodes in the new version of the tree data structure. In such embodiments, a new pattern is derived and stored. An indication of the determined correctness may be stored with the new derived pattern.

At 626, a new pattern is derived. In some embodiments, step 626 is optional (e.g., the inference pattern engine partially predicted (greater than or equal to a confidence threshold) or correctly predicted the mapping).

At 628, a derived pattern is retrieved from an inference patterns store.

At 630, the retrieved derived pattern is utilized to generate an inference pattern engine response.

At 632, the inference pattern engine response is provided. In some embodiments, the inference pattern engine response is provided to a client device. In some embodiments, the inference pattern engine response is provided to a runtime agent.

In some embodiments, steps 616-626 (step 626 if necessary) are performed in place of steps 628, 630 to determine if the inference pattern engine is still producing an accurate mapping of the one or more variables included in the input to elements associated with a webpage or application content.

Figure 7A:
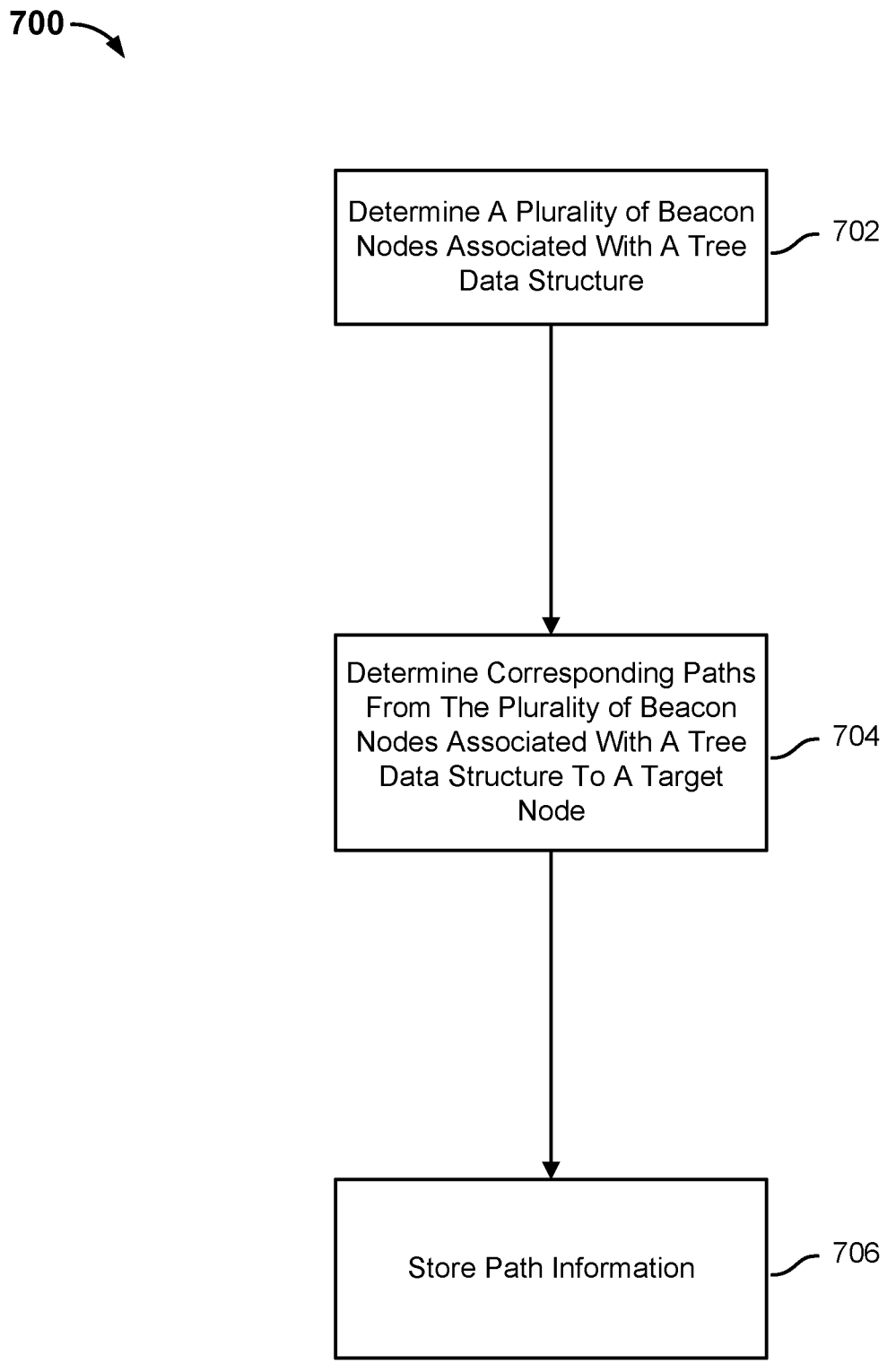
FIG. 7 is a flow diagram illustrating a process to derive a pattern in accordance with some embodiments.

FIG. 7 is a flow diagram illustrating a process to derive a pattern in accordance with some embodiments. In the example shown, process 700 may be implemented by an inference pattern engine, such as inference pattern engine 414. In some embodiments, process 700 is implemented to perform some or all of steps 612 and 624 of process 600.

At 702, a plurality of beacon nodes associated with a tree data structure are determined. A beacon node in a node in a tree data structure that has a set of attributes (i.e., a fingerprint) that only maps to one element in the tree data structure. The set of attributes are constant, regardless of which version of a webpage or application is accessed.

At 704, corresponding paths from the plurality of beacon nodes associated with the tree data structure to a target node are determined. A target node is a node in the tree data structure that corresponds to a variable included in the input corresponding to an element associated with the webpage or application content.

At 706, the path information is stored. The stored path information is utilized by the inference pattern engine in a subsequent iteration to locate in the new version of the tree data structure one or more target nodes corresponding to one or more variables included in the input.

Figure 8A:
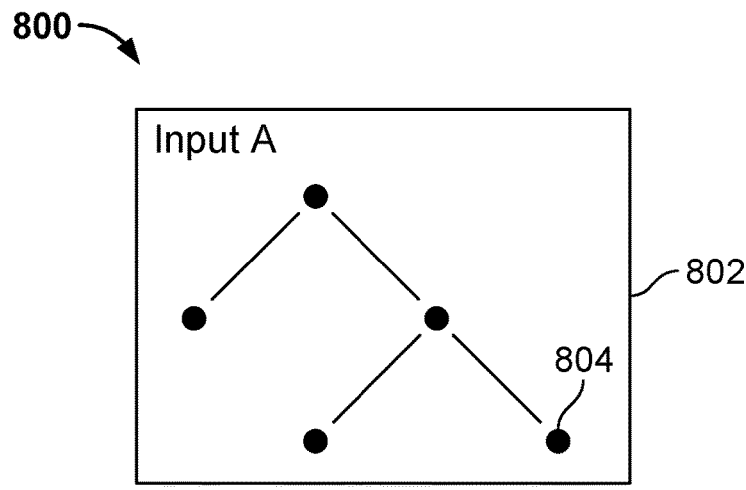
FIGS. 8A-8K depict an example of utilizing an LLM response to derive a pattern in accordance with some embodiments.
Figure 8B:
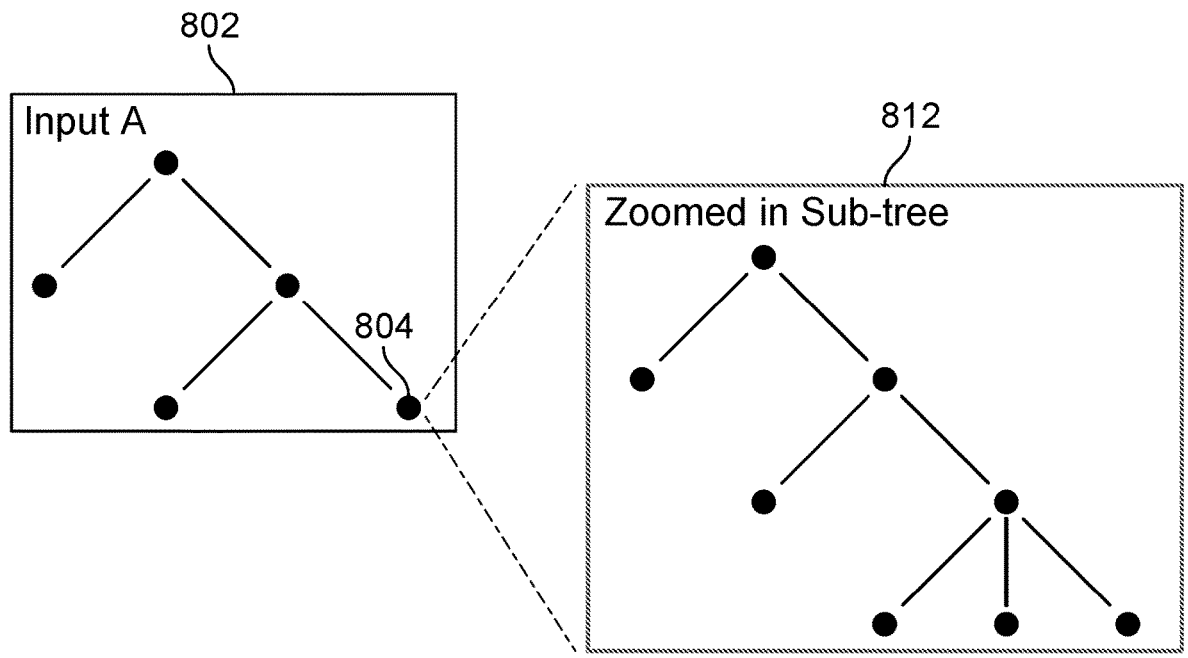

FIG. 8A is an example of a tree data structure in accordance with some embodiments. In the example shown, input 800 is associated with tree data structure 802. Tree data structure 802 may be a DOM or a UI tree data structure. Tree data structure 802 includes a plurality of nodes, such as node 804. A node may be associated with a sub-tree, such as sub-tree 812 depicted in FIG. 8B.

Figure 8C:
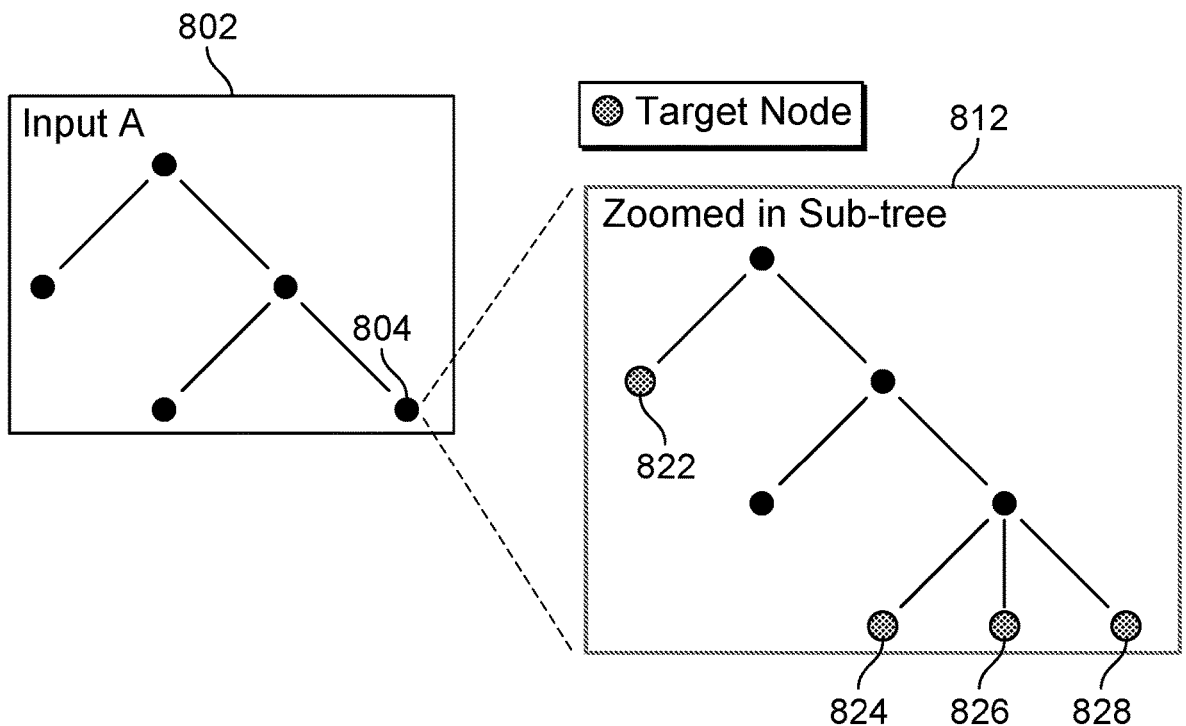

An LLM response may map one or more variables included in an input to one or more corresponding nodes in a tree data structure. In the example shown in FIG. 8C, nodes 822, 824, 826, 828 correspond to variables included in an input corresponding to one or more elements associated with the webpage or application content. The location of nodes 822, 824, 826, 828 may change each time a webpage or application with which tree data structure 802 is associated, is accessed.

Figure 8D:
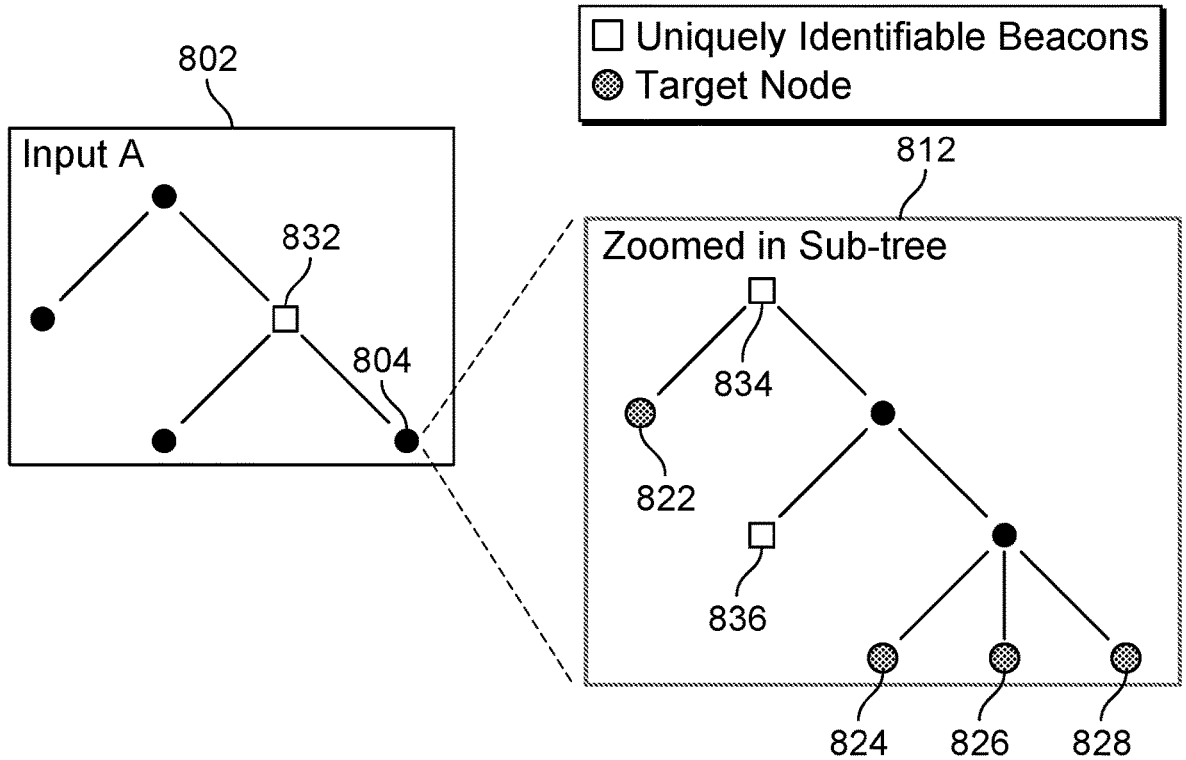

An inference patterns engine is configured to determine a plurality of beacon nodes. A beacon node in a tree data structure is unique because it has a set of attributes (i.e., a fingerprint) that only maps to one element in the tree data structure. The attributes associated with the beacon node remain the same, regardless of the tree data structure version being accessed. In the example shown in FIG. 8D, nodes 832, 834, 836 are beacon nodes.

Figure 8E:
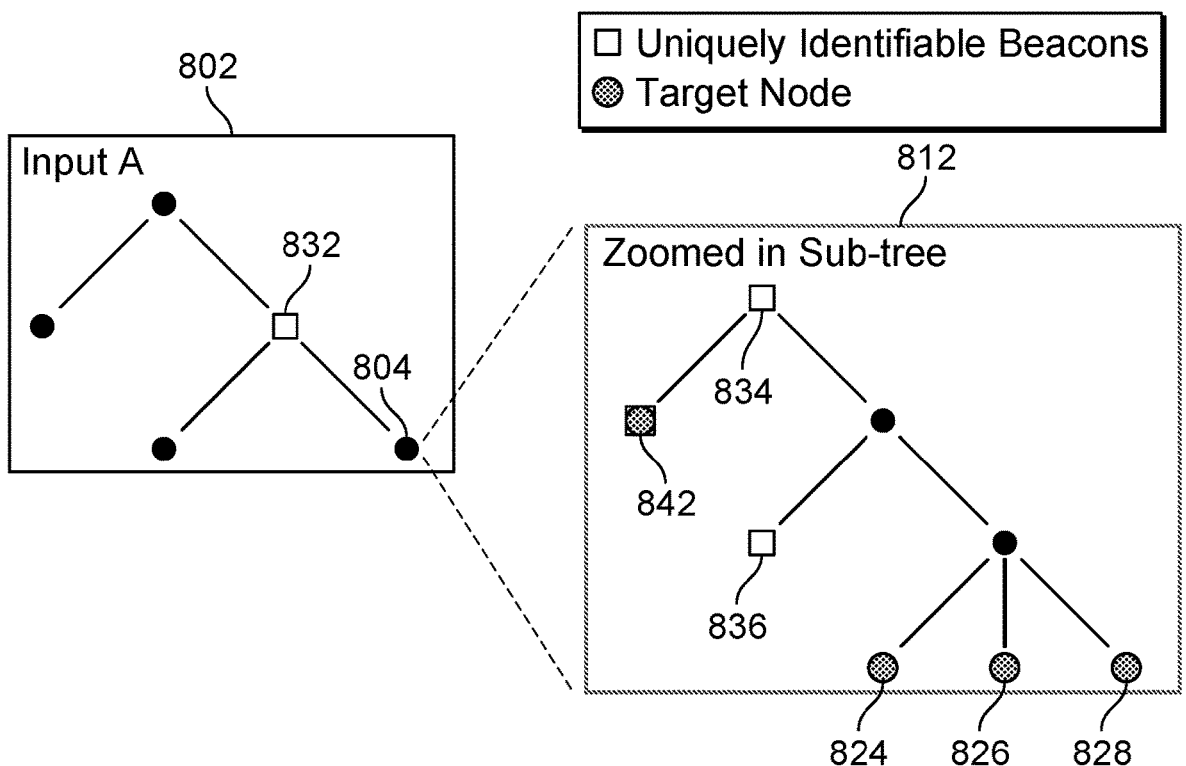
Figure 8F:
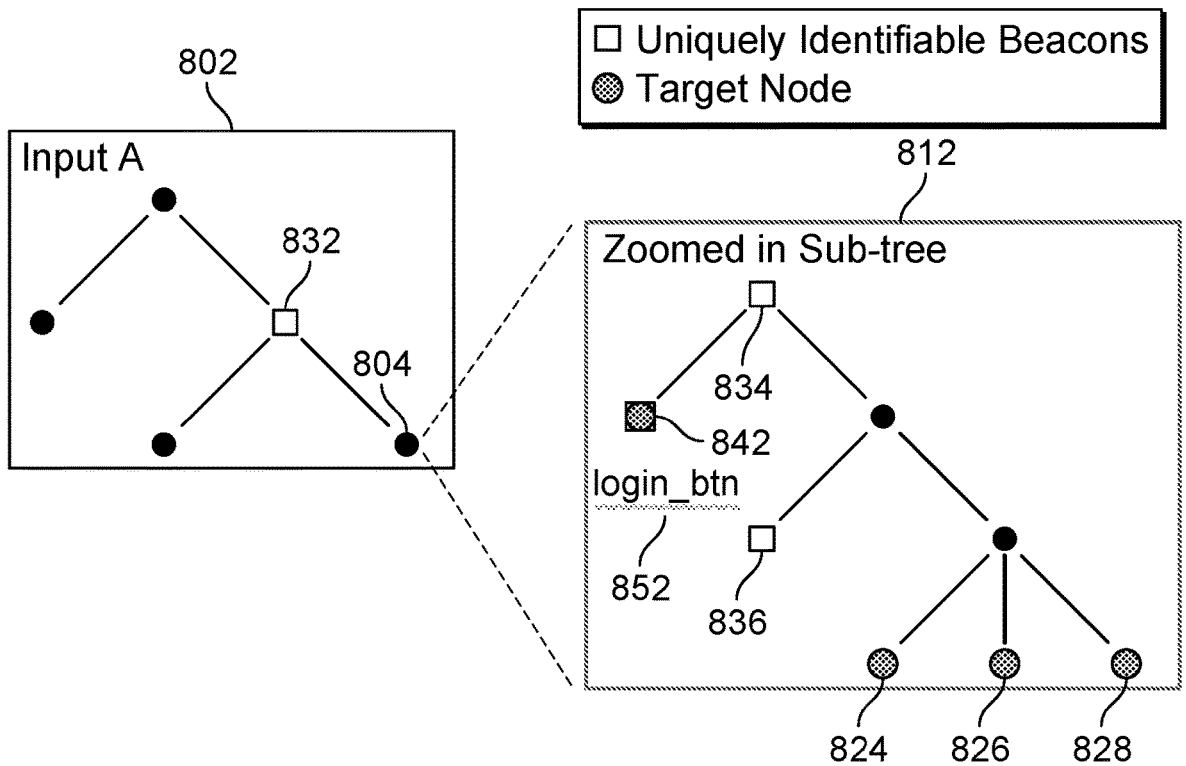
Figure 8G:
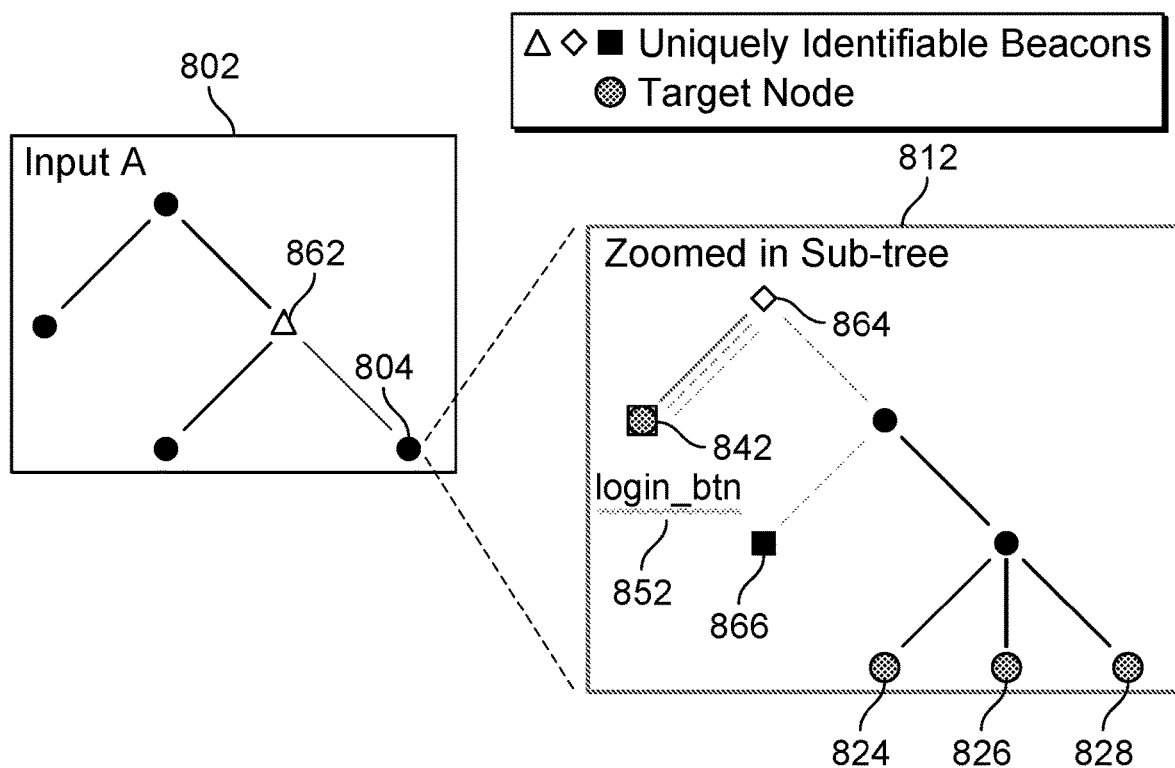
Figure 8H:
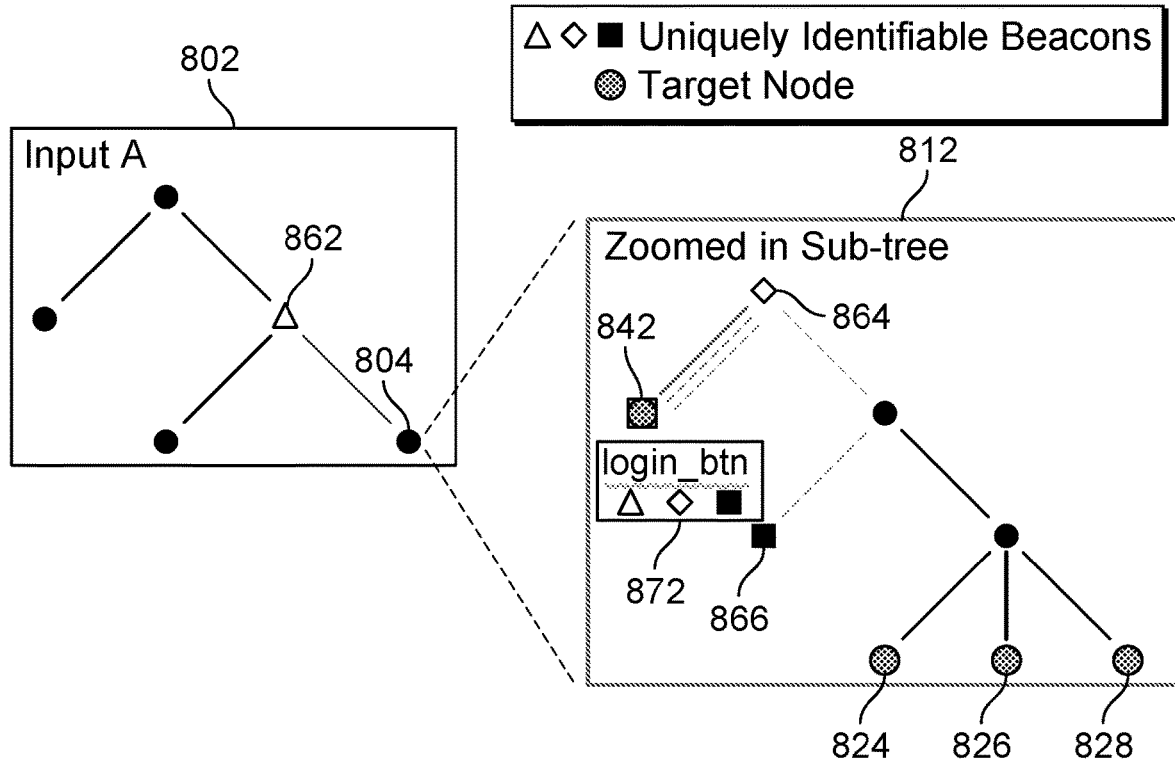

FIG. 8E depicts a target node 842 corresponding to a variable included in an input that corresponds to an element associated with webpage or application content. As seen in FIG. 8F, target node 842 corresponds to a variable 852 of "login_btn". As seen in FIG. 8G, the inference patterns engine is configured to determine the path information 862, 864, 866 from beacon nodes 832 834, 836, respectively, to target node 842. As seen in FIG. 8H, the derived pattern 872 for node 842 is determined and stored.

Figure 8I:
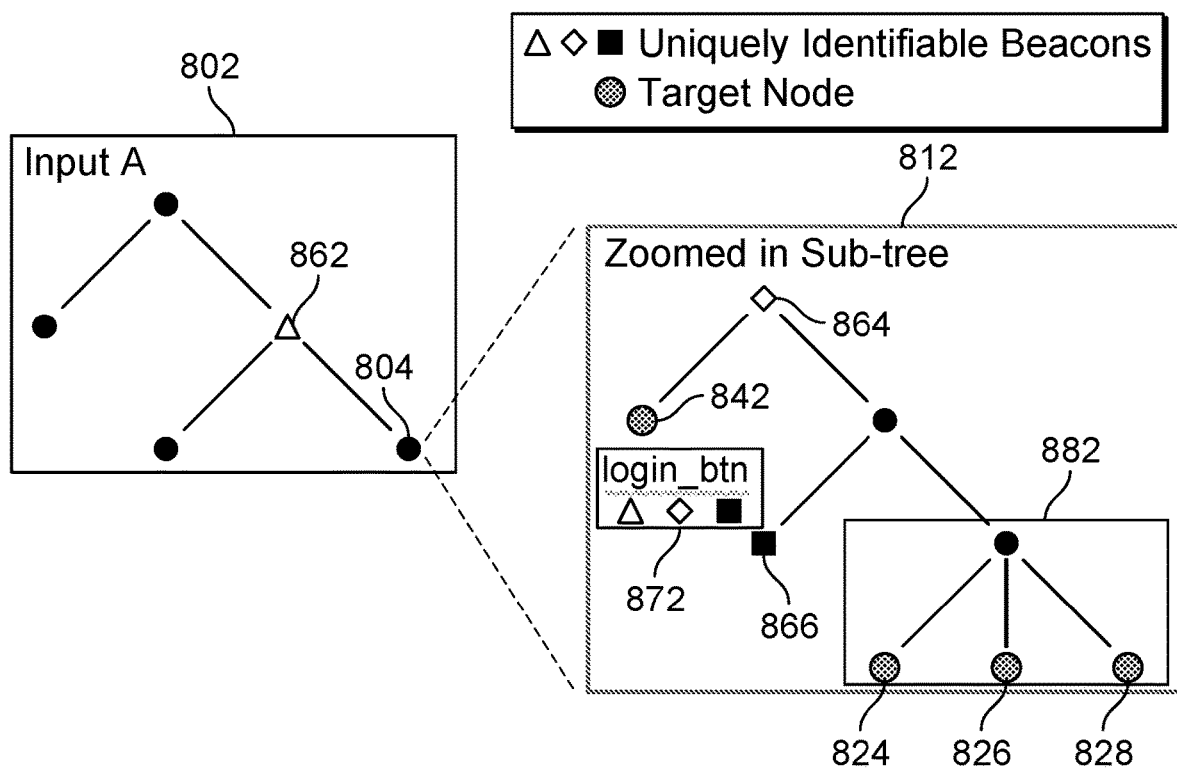

The path information 862, 864, 866 associated with beacon nodes 832, 834, 836, respectively, may be utilized to the inference patterns engine to determine path information associated with one or more other target nodes. For example, as seen in FIG. 8I, the path information 862, 864, 866 associated with beacon nodes 832, 834, 836, respectively, may be utilized to determine the path information associated with sub-tree 882, which includes nodes 824, 826, 828.

Figure 8J:
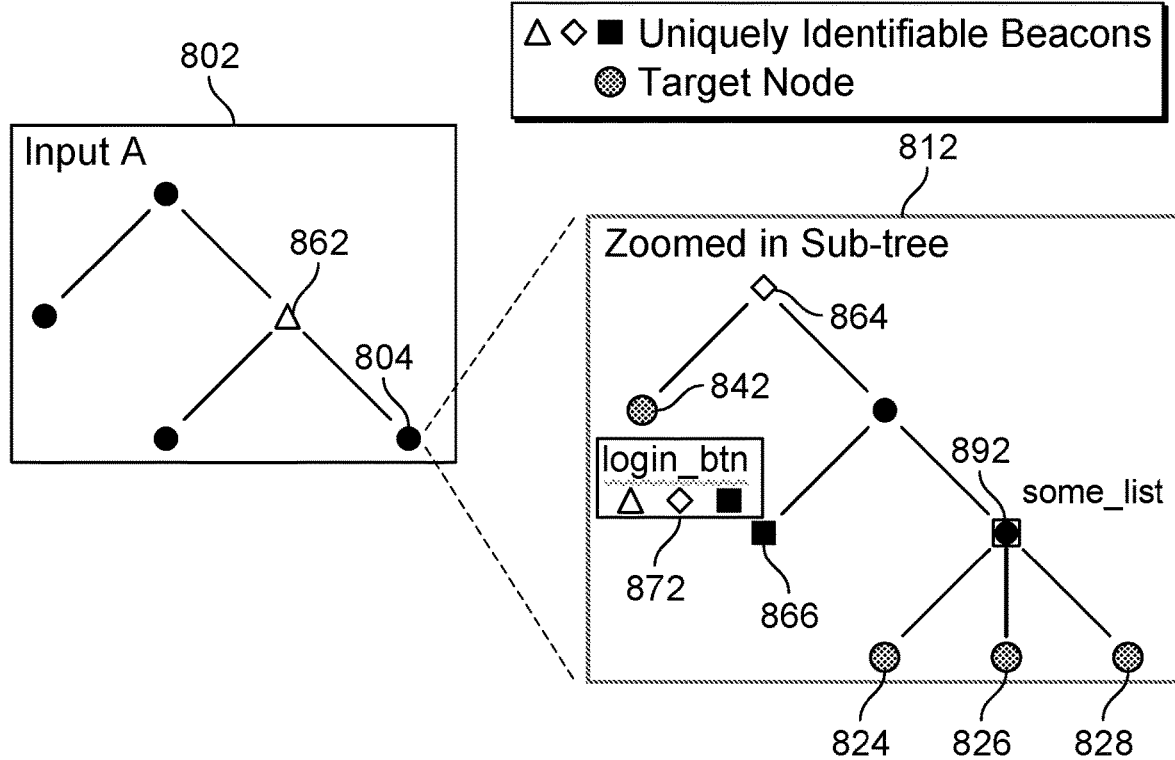
Figure 8K:
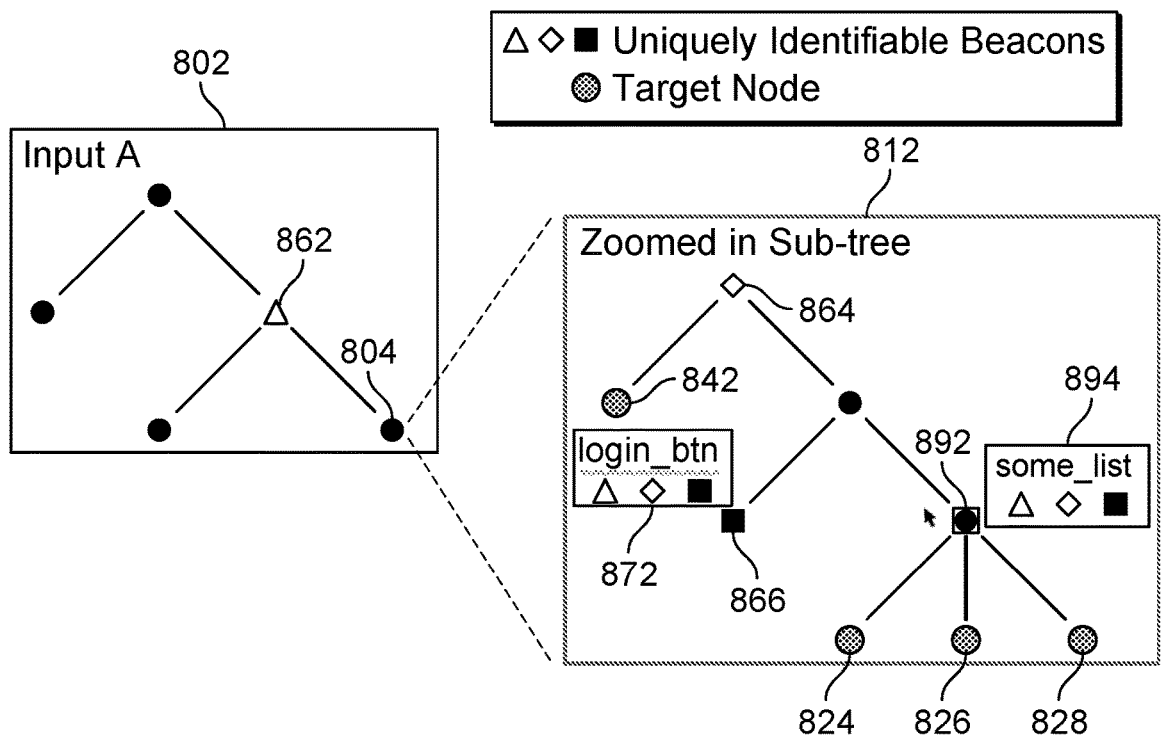

As seen in FIG. 8J, node 892 corresponds to an input variable "some_list". As seen in FIG. 8K, the inference patterns engine is configured to utilize the path information 862, 864, 866 associated with beacon nodes 832, 834, 836, respectively, to derive pattern 894 for node 892.

Figure 9A:
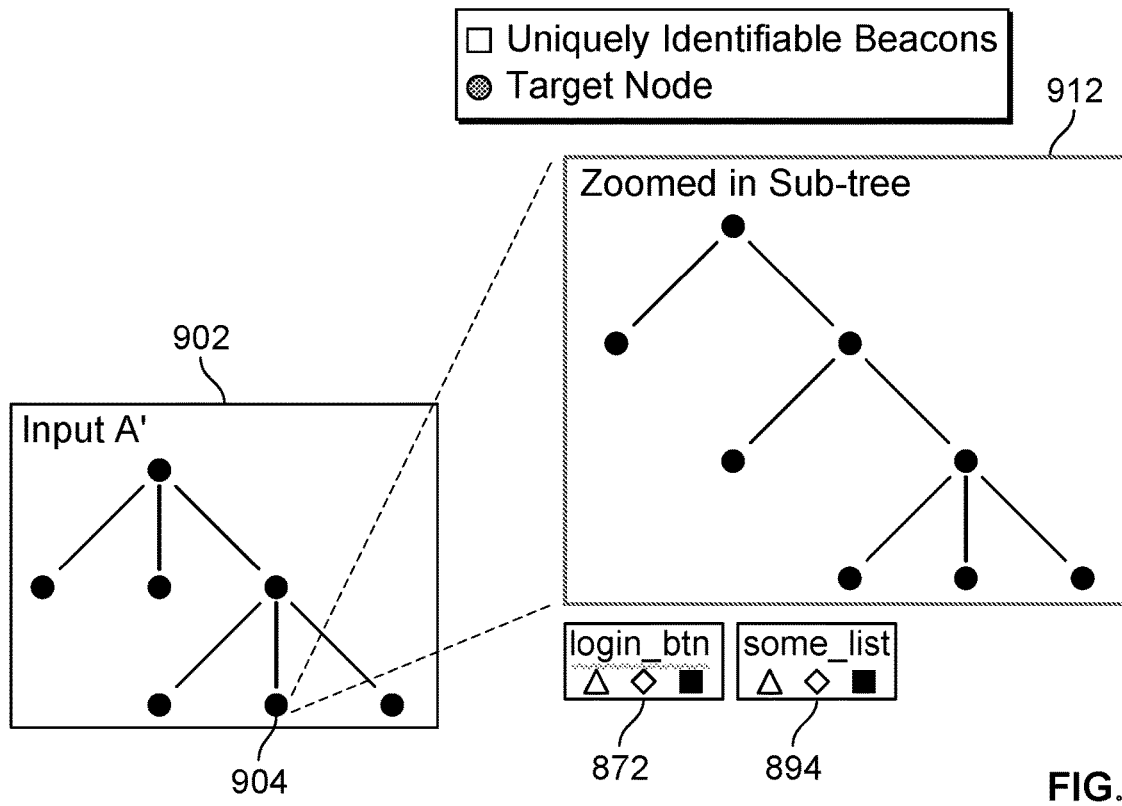
FIGS. 9A-9D depict an example of utilizing a derived pattern to generate an inference pattern engine response in accordance with some embodiments.

FIG. 9A is an example of a tree data structure in accordance with some embodiments. In the example shown, webpage or application 900 has an associated tree data structure 902 having a plurality of nodes. Node 904 is associated with subtree 912. Subtree 912 has a similar structure as subtree 812.

Figure 9B:
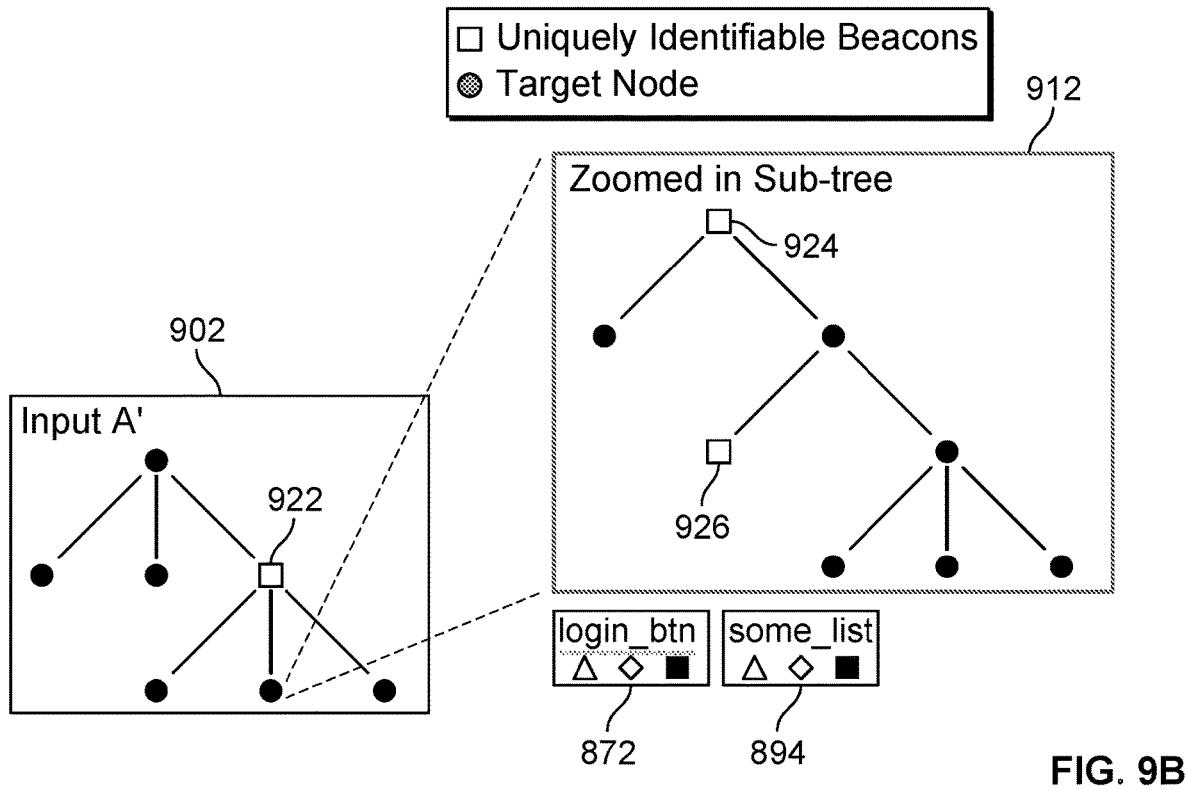
Figure 9C:
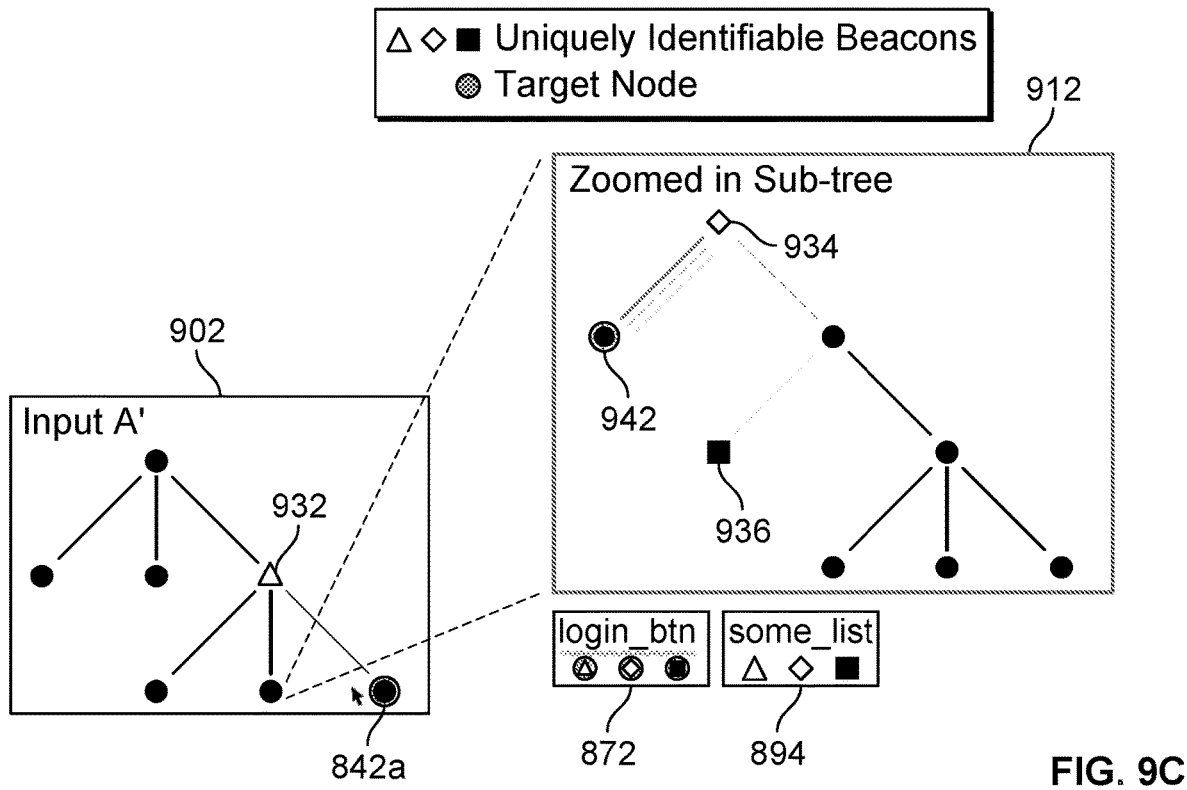
Figure 9D:
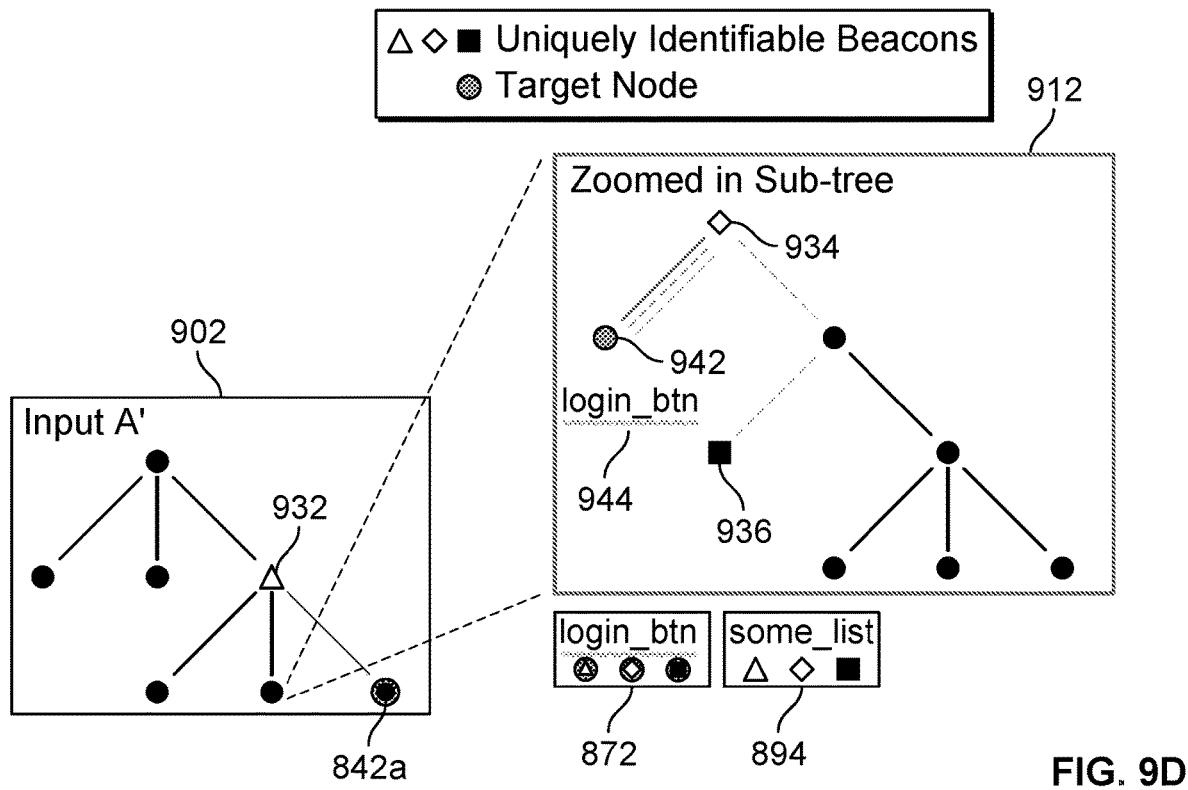

The inference pattern engine utilizes the derived patterns 872, 894 to predict path information associated with nodes included in subtree 912. As seen in FIG. 9B, the inference pattern engine determined nodes 922, 924, 926 are beacon nodes because of their associated properties. As seen in FIG. 9C, the inference pattern engine utilizes the stored path information 872 and beacon nodes 932, 934, 936 to determine path information associated with node 942. As seen in FIG. 9D, the inference pattern engine has determined that node 942 corresponds to a variable 944 of "login_btn".

The inference pattern engine compares the prediction associated with node 942 to an LLM response to determine a correctness of the prediction. In some embodiments, node 942 corresponds to a login button associated with a webpage or application. In some embodiments, node 942 does not correspond to a login button associated with a webpage or application.

Figure 10:
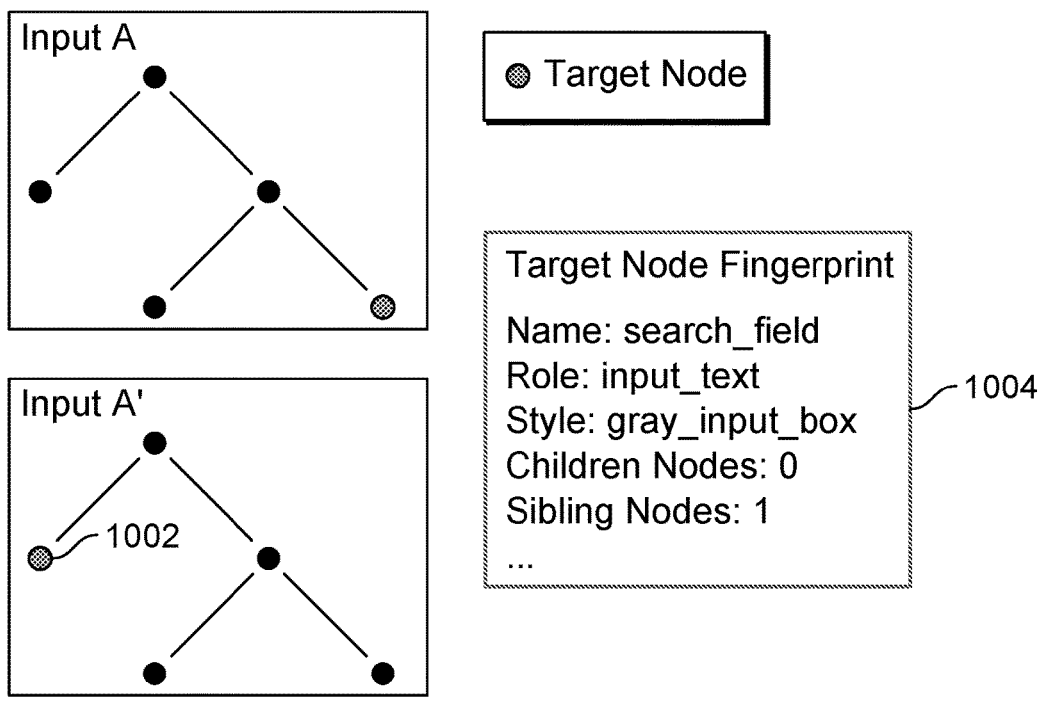
FIG. 10 is an example of a fingerprint associated with a tree data structure node in accordance with some embodiments.

For identifying unique nodes in a tree, the inference pattern engine observes and learns over time the traits unique to the target node, such that the inference pattern engine can locate the same node in a new tree, so long as the traits used to identify the target node remain unique to the target node. As seen in FIG. 10, node 1002 is associated with a set of attributes 1004.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
   generate a plurality of prompts based on a plurality of inputs and processed content associated with a tree data structure;
   provide the plurality of prompts to a large language model;
   based on a response received from the large language model that maps one or more variables associated with the plurality of inputs to one or more elements associated with the processed content associated with the tree data structure received from the large language model, derive corresponding patterns mapping one or more variables associated with the plurality of inputs to the one or more elements associated with the processed content associated with the tree data structure;
   store the derived pattern mappings and a corresponding correctness associated with the derived pattern mappings based on the large language model response;
   receive a subsequent input and subsequent processed content associated with the tree data structure;
   determine that a correctness associated with a stored derived pattern mapping from the derived pattern mappings is greater than a confidence threshold; and
   utilize the stored derived pattern mapping to generate a second response for the subsequent input; and
a memory coupled to the processor and configured to provide the processor with one or more instructions.

2. The system of claim 1, wherein an input of the plurality of inputs is a structured query.

3. The system of claim 1, wherein an input of the plurality of inputs is freeform text.

4. The system of claim 1, wherein the processor is configured to provide the large language model response.

5. The system of claim 1, wherein to derive the pattern mappings, the processor is configured to determine a plurality of beacon nodes in the tree data structure associated with the processed content.

6. The system of claim 5, wherein a beacon node of the plurality of beacon nodes includes a consistent set of attributes across a plurality of instances associated with a webpage or application.

7. The system of claim 5, wherein to derive the pattern mappings, the processor is configured to determine in the tree data structure associated with the processed content corresponding paths from the plurality of beacon nodes to target nodes corresponding to the one or more variables associated with an input of the plurality of inputs.

8. The system of claim 1, wherein the processor is configured to receive an instance of an input of the plurality of inputs and the processed content associated with the tree data structure.

9. The system of claim 8, wherein the processor is configured to generate an inference pattern engine response utilizing the derived pattern by mapping one or more variables included in the instance of an input of the plurality of inputs to the one or more elements included in the instance of the processed content associated with the tree data structure.

10. The system of claim 9, wherein the processor is configured to:
generate a second prompt based on the instance of the input and the processed content associated with the tree data structure; and
provide the second prompt to the large language model.

11. The system of claim 10, wherein the processor is configured to:
receive from the large language model a corresponding response that maps one or more variables associated with the instance of the input to the instance of one or more elements associated with the instance of the processed content associated with the tree data structure; and
compare the inference pattern engine response to the corresponding response received from the large language model.

12. The system of claim 11, wherein the processor is configured to determine a correctness associated with the inference pattern engine response based on the comparison.

13. The system of claim 12, wherein the processor is configured to receive a subsequent instance of the input and the processed webpage or application content.

14. The system of claim 13, wherein the processor is configured to determine, based on the correctness associated with the inference pattern engine response, that the confidence threshold has been reached for the input and the processed content associated with the tree data structure.

15. The system of claim 14, wherein the processor is configured to retrieve the inference pattern engine response from an inference patterns store.

16. The system of claim 15, wherein the processor is configured to determine a subsequent inference pattern response based on the inference pattern response and the subsequent instance of the input and the processed content associated with the tree data structure.

17. The system of claim 16, wherein the processor is configured to provide the subsequent inference pattern response.

18. The system of claim 17, wherein the processor is configured to determine an accuracy associated with the subsequent inference pattern response by comparing the corresponding inference pattern response to the subsequent large language model response generated based on the subsequent instance of the input and the processed content associated with the tree data structure.

19. A method, comprising:
generating a plurality of prompts based on a plurality of inputs and processed content associated with a tree data structure;
providing the plurality of prompts to a large language model;
based on a response received from the large language model that maps one or more variables associated with the plurality of inputs to one or more elements associated with the processed content associated with the tree data structure received from the large language model, deriving corresponding patterns mapping one or more variables associated with the plurality of inputs to the one or more elements associated with the processed content associated with the tree data structure;
storing the derived pattern mappings and a corresponding correctness associated with the derived pattern mappings based on the large language model response;
receiving a subsequent input and subsequent processed content associated with the tree data structure;
determining that a correctness associated with a stored derived pattern mapping from the derived pattern mappings is greater than a confidence threshold; and
utilizing the stored derived pattern mapping to generate a second response for the subsequent input.

20. A computer program product embodied in a non-transitory computer readable medium and comprising computer instructions for:
generating a plurality of prompts based on a plurality of inputs and processed content associated with a tree data structure;
providing the plurality of prompts to a large language model;
based on a response received from the large language model that maps one or more variables associated with the plurality of inputs to one or more elements associated with the processed content associated with the tree data structure received from the large language model, deriving corresponding patterns mapping one or more variables associated with the plurality of inputs to the one or more elements associated with the processed content associated with the tree data structure;
storing the derived pattern mappings and a corresponding correctness associated with the derived pattern mappings based on the large language model response;
receiving a subsequent input and subsequent processed content associated with the tree data structure;
determining that a correctness associated with a stored derived pattern mapping from the derived pattern mappings is greater than a confidence threshold; and
utilizing the stored derived pattern mapping to generate a second response for the subsequent input.

\* \* \* \* \*